US012252598B2

(12) United States Patent
Bargatin et al.

(10) Patent No.: US 12,252,598 B2
(45) Date of Patent: Mar. 18, 2025

(54) SYSTEMS AND METHODS FOR PHOTOPHORETIC PROPULSION FOR FLIGHT

(71) Applicant: The Trustees of the University of Pennsylvania, Philadelphia, PA (US)

(72) Inventors: Igor Bargatin, Wynnewood, PA (US); Zhipeng Lu, Philadelphia, PA (US); Mohsen Azadi, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 454 days.

(21) Appl. No.: 17/742,887

(22) Filed: May 12, 2022

(65) Prior Publication Data
US 2022/0380039 A1 Dec. 1, 2022

Related U.S. Application Data

(60) Provisional application No. 63/187,528, filed on May 12, 2021.

(51) Int. Cl.
*C08J 5/18* (2006.01)
*C08J 5/00* (2006.01)

(52) U.S. Cl.
CPC . *C08J 5/18* (2013.01); *C08J 5/00* (2013.01); *C08J 5/005* (2013.01); *C08J 2367/02* (2013.01)

(58) Field of Classification Search
CPC ....... C08J 5/005; C08J 5/00; C08J 5/18; C08J 2367/02; C08J 7/06; B64B 1/00
USPC ........................................................ 376/108
See application file for complete search history.

(56) References Cited

U.S. PATENT DOCUMENTS 9,222,874 B2 * 12/2015 Hill .................... G01N 15/14
2022/0095446 A1 * 3/2022 Feldhaus ................ H05H 3/02

OTHER PUBLICATIONS

Beresnev et al., "On the possibility of particle's photophoretic levitation in stratosphere," Atmospheric and Oceanic Optics (English Translation), 16, 44-48 (2003).
Bogolepov et al., "Photophoresis of Model Aerosol Particles," High Temperature, 34, No. 5, 740-745 (1996).
Cheremisin et al., "Gravito-photophoresis and aerosol stratification in the atmosphere," Aerosol Science 36 1277-1299 (2005).
Cheremisin et al., "The global picture of aerosol layers formation in the stratosphere and in the mesosphere under the influence of gravito-photophoretic and magneto-photophoretic forces," J. Geophys. Res., 116, D19204, (2011) doi:10.1029/2011JD015958.
Cortes, et al., "Photophoretic levitation of macroscopic nanocardboard plates," Adv. Mater., 32, 1906878 (2020).
Dong et al., "Investigation on the photophoretic lift force acting upon particles under light irradiation," Journal of Aerosol Science, 113, 114-118 (2017).

(Continued)

*Primary Examiner* — Kiet T Nguyen
(74) *Attorney, Agent, or Firm* — Baker Botts LLP

(57) ABSTRACT

Systems and methods for achieving levitation via a photophoretic effect are provided. In certain embodiments, a structure of ultralight materials is provided, for example a BoPET film and carbon nanotubes and has a top and bottom side, made of two separate materials. When the bottom side is illuminated by light at certain intensity, it can result in an upward lift force being applied to the entire structure, causing the structure to levitate.

14 Claims, 21 Drawing Sheets

(56) References Cited

OTHER PUBLICATIONS

Feuer, "Theory of the Thermal Accommodation Coefficients of a Diatomic Gas," J. Chem. Phys. 39, 1311-1316 (1963).
Gilbey, "A re-examination of thermal accommodation coefficient theory," J. Phys. Chem. Solids, 23, 1453-1461 (1962).
Gong et al., "Optical configurations for photophoretic trap of single particles in air," Rev. Sci. Instrum. 87, 103104 (2016).
Goodman, "Thermal Accommodation Coefficients," J. Phys. Chem., 84, 1431-1445, (1980).
Goodman et al., "Formula for Thermal Accommodation Coefficients," The journal of chemical physics, 46(6), 2376-2386 (1967).
Grau et al., "Method for measuring thermal accommodation coefficients of gases on thin film surfaces using a MEMS sensor structure," Journal of Vacuum Science & Technology A 34(4), 041601 (2016).
Honig et al., "Effect of Molecularly-Thin Films on Lubrication Forces and Accommodation Coefficients in Air," J. Phys. Chem. C 114, 20114-20119 (2010).
Horvath, "Photophoresis—a Forgotten Force??," KONA Powder and Particle Journal No., 31, 181-199 (2014).
Keith, "Photophoretic levitation of engineered aerosols for geoengineering," PNAS, 107, 38, 16428-16431 (2010).
Kerker et al., "Photophoretic force on aerosol particles in the free-molecule regime," J. Opt. Soc. Am., 72(9), 1267-1272 (1982).
Ketsdever et al., "Radiometric phenomena: from the 19th to the 21st century," Vacuum, 86, 1644-1662 (2012).
Loesche et al., "Photophoresis on particles hotter/colder than the ambient gas in the free molecular flow," Journal of Aerosol Science, 97, 22-33 (2016).
Loesche et al., "Photophoresis on particles hotter/colder than the ambient gas for the entire range of pressures," Journal of Aerosol Science, 102, 55-71 (2016).
Mackowski, "Photophoresis of aerosol particles in the free molecular and slip-flow regimes," Int. J. Heat Mass Transfer, 32(5), 843-854 (1989).
Ou et al., "Low Knudsen No. photophoresis of aerosol spheroids," Journal of Colloid and Interface Science 282, 69-79 (2005).
Pluchino, "Photophoretic force on particles for low Knudsen number," Applied Optics, 22(1), 103-106 (1983).
Reed, "Low Knudsen Number photophoresis," J. Aerosol Sci., 8(2), 123-131 (1977).
Rohatschek, "Photophoresis and accommodation," Optika Atmosfery i Okeana, 27(1), 87-96 (2014).
Rohatschek, "Semi-empirical model of photophoretic forces for the entire range of pressures," J. Aerosol Sci., 26(5), 717-734 (1995).
Rosen et al. "The Photophoretic Force," Journal of Colloid Science, 19, 50-60 (1964).
Tehranian et al.," Photophoresis of micrometer-sized particles in the free molecular regime," International Journal of Heat and Mass Transfer 44, 1649-1657 (2001).
Thomas et al., "A Comparative Study of Accommodation Coefficients by the Temperature Jump and Low-Pressure Methods and Thermal Conductivities of He, Ne, and $CO_2$," The journal of chemical physics, 22(2), 300-305 (1954).
Tong, "Experiments on Photophoresis and Thermophoresis," Journal of Colloid and Interface Science, 51(1), 143-151 (1975).
Tong, "Photophoretic force in the free molecule and transition regimes," Journal of Colloid and Interface Science, 43(1), 78-84 (1973).
Trott et al., "Measurement of Gas-Surface Accommodation," AIP Conference Proceedings 1084, 621-628 American Institute of Physics (2008).
Williams, "Thermophoretic forces acting on a spheroid," J. Phys. D: Appl. Phys. 19, 1631-1642 (1986).
Xu et al., "A review of high-temperature selective absorbing coatings for solar thermal applications," Journal of Materiomics, 6, 167-182 (2020).
Zulehner et al., "Photophoresis of Nonspherical Bodies in the Free Molecule Regime," Journal of Colloid and Interface Science, 138(2), 555-564 (1990).

\* cited by examiner

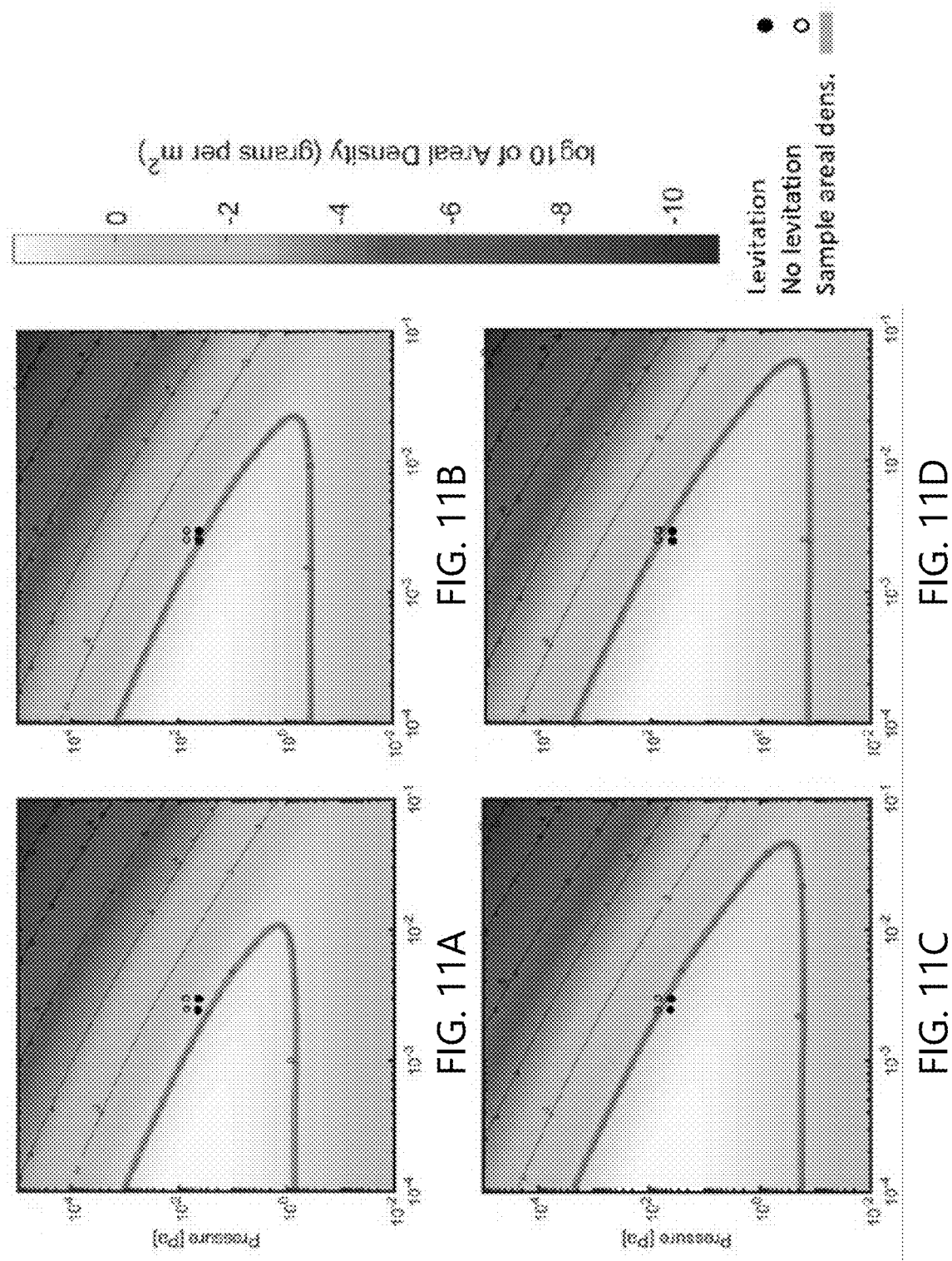

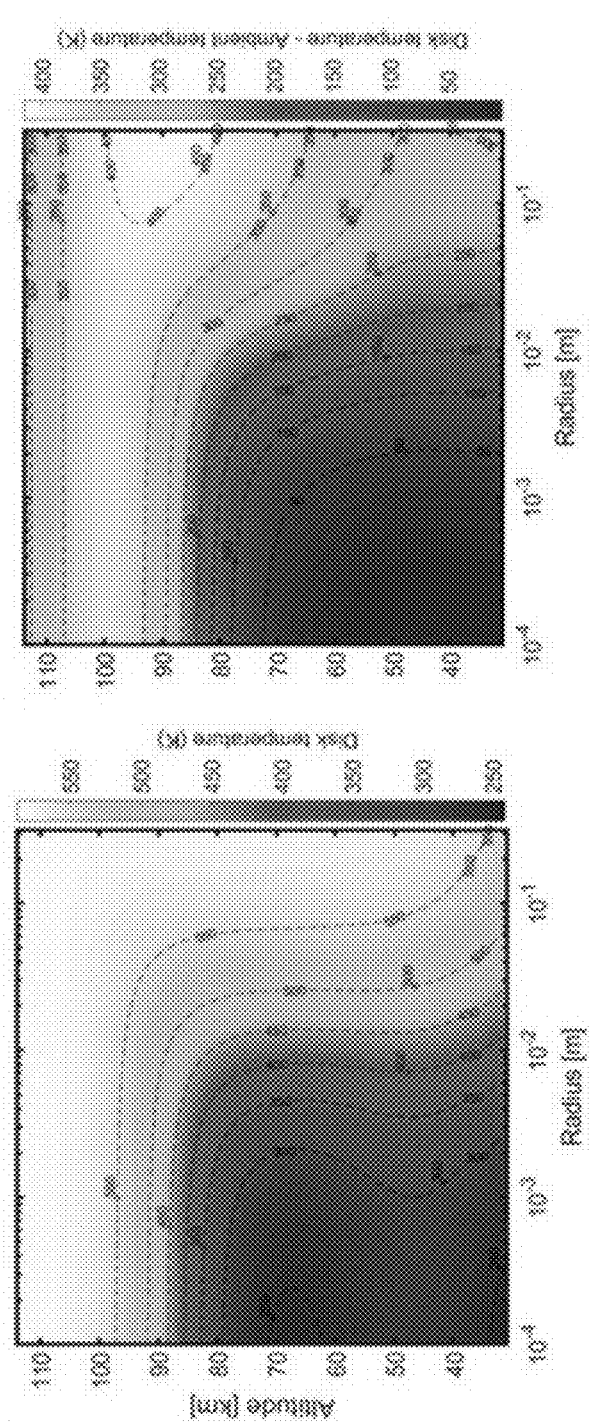

SYSTEMS AND METHODS FOR PHOTOPHORETIC PROPULSION FOR FLIGHT

CROSS-REFERENCE TO RELATED APPLICATIONS

This application claims priority to U.S. Provisional Application Ser. No. 63/187,528, filed on May 12, 2021, which is incorporated by reference herein in its entirety.

GRANT INFORMATION

This invention was made with government support under 1845933 awarded by the National Science Foundation. The government has certain rights in the invention.

BACKGROUND

Certain flight mechanisms are unable to achieve sustained flight in the Earth's mesosphere, which can be located approximately between 50 to 100 kilometers above sea level. Due to high atmospheric drag, this region can be below the minimum altitude required for orbital spacecraft, such as satellites. Further, due to the decreased air density of this region, certain modern aircraft, for example airplanes and balloons, are unable to generate enough lift to maintain sustained flight at these altitudes. Certain craft, such as sounding rockets, can maintain this altitude for several minutes, however, such transient timeframes cannot be used for sustained flights, and can limit the practical applications of craft at those altitudes.

Photophoresis is an effect wherein particles or other materials can move or be moved when illuminated by light. In the free molecular regime, the photophoretic force can result from the difference in the velocity of incident and departing gas molecules from a heated surface, where in the mean free path ($\lambda$) can be much larger than the characteristic size (a) of the object. Alternatively, in the continuum region, where the mean free path is much smaller than the characteristic size of the object ($\lambda \ll a$), the force can be generated through thermal creep of the molecules from a colder side to a hotter side. In the transition regime, where $\lambda$ is approximately equal to a (which corresponds to a Knudsen number (Kn) of approximately 1, as Kn=$\lambda$/a), the photophoretic force can reach a maximum. In this regime, the effects from both the continuum regime and the free molecular regime contribute to the overall photophoretic effect.

The force resulting from this effect can be used to affect microscopic particles in aerosols as well as altering the optical trapping characteristics of microscopic particles. However, even in the transition regime, the photophoretic effect can produce limited lift force. Even at its maximum, the value of the force from the effect can be in the micronewton range. This can limit the practical applicability of the effect, as these low forces can reduce constrain the mass of movable objects to the milligram range or smaller.

Accordingly, there exists a need for a technique which can both decrease the weight of materials to be levitated, while also increasing the photophoretic force generated when exposed to light. In this way, the lift force generated can be utilized for practical applications, at various heights within the atmosphere.

SUMMARY

Systems and methods for controlled levitation of thin-film materials are disclosed herein.

In certain embodiments, ultrathin materials can be produced which have negligible temperature differences, but rather have different surface properties which can produce a photophoretic force sufficient to generate lift. In situations where the temperature is approximately uniform throughout the surface of the materials, the lift can be generated through a difference in the thermal accommodation coefficient.

In certain embodiments, different materials can have a unique $\alpha$, which can vary based on a plurality of factors, including temperature, surface roughness, density, atomic or molecular weight of the surface and the gas, and electronic properties of the surface. Where the thermal accommodation coefficient is larger on the bottom surface of a structure, it can generate a lift force, even if the top and bottom are at approximately the same temperature, as long as both temperatures are higher than that of the ambient gas.

In certain embodiments, the ultrathin materials can be produced with submicron thickness and various nanoscale surfaces on the top and bottom of the material. The ultrathin material can be a biaxially-oriented polyethylene terephthalate ("BoPET") film, also known as a mylar film, which is coated with carbon nanotubes on a single side. This can allow the thermal accommodation coefficient to generate a photophoretic forces that levitates the resulting structure.

In certain embodiments, a 500-nanometer thick BoPET film (also known as an OSfilm) can have a 300 nanometer thick layer of carbon nanotubes (CNTs) deposited onto a bottom side. In certain alternative embodiments, the BoPET film may be coated with a layer of aluminum oxide in addition to a CNT layer. The aluminum oxide layer can be deposited using, for example, atomic layer deposition and help improve the rigidity of the resultant structure, for example, by preventing curling or other deformations of the resultant structure. Other methods of depositing the aluminum oxide layer onto the film are contemplated, including, for example and not limitation, dropcasting.

In certain embodiments, a BoPET film, which has been coated with a CNT layer or other layer, can be further contained within a frame comprising a lightweight or ultrathin material. This frame can be attached to the film through a variety of connection techniques, including adhesives, welding, crimping, or other techniques which would be known to a person of ordinary skill in the art.

In certain embodiments, the increased collisions between the gas molecules and the structure can result in the gas molecules departing the CNT side having a higher velocity than the gas molecules departing the BoPET side of the structure. In certain embodiments, the force generated through differences in thermal accommodation coefficient can be altered through variation of the properties of the structure.

In certain embodiments, a light field can be provided which can optically trap the structure. This light field can comprise a central area, with a first light intensity sufficient to produce a lift force according to the previous embodiments, and a border ring, with a second light intensity configured to create a restoring force which can tilt the disk and push it towards the central area.

In certain embodiments, the thermalization time of the structure can be calculated, as $$t_{therm} = \frac{((\rho C_p V)_{disk})}{h_{tot} A_{disk}} \quad (1)$$

For example, and not limitation, if a BoPET film is used, p can equal approximately 1390 kg/m³ and $C_p$ can equal approximately 1.01 kJ/kgK, $h_{tot}$ can represent $h_{cond}+h_{conv}+h_{rad}$, and $A_{disk}$ is $2\pi a^2$. In certain embodiments, the BoPET film can reach thermal equilibrium in approximately 0.05 seconds.

In certain embodiments, various other components can be attached to the structured material, without inhibiting the ability of the material to achieve lift.

The accompanying drawings, which are incorporated and constitute part of this disclosure, illustrate certain embodiments and serve to explain the principles of the disclosed subject matter.

BRIEF DESCRIPTION OF THE DRAWINGS

FIGS. 11A-11D illustrate example areal density graphs for determining conditions of levitation in accordance with certain embodiments of the disclosed subject matter.

FIGS. 14A-14D illustrate another example areal density graphs for the prediction of near-space flight in accordance with certain embodiments of the disclosed subject matter.

DETAILED DESCRIPTION

The disclosed subject matter provides levitation and flight of structures using a photophoretic effect.

Figures 1A, 1B:
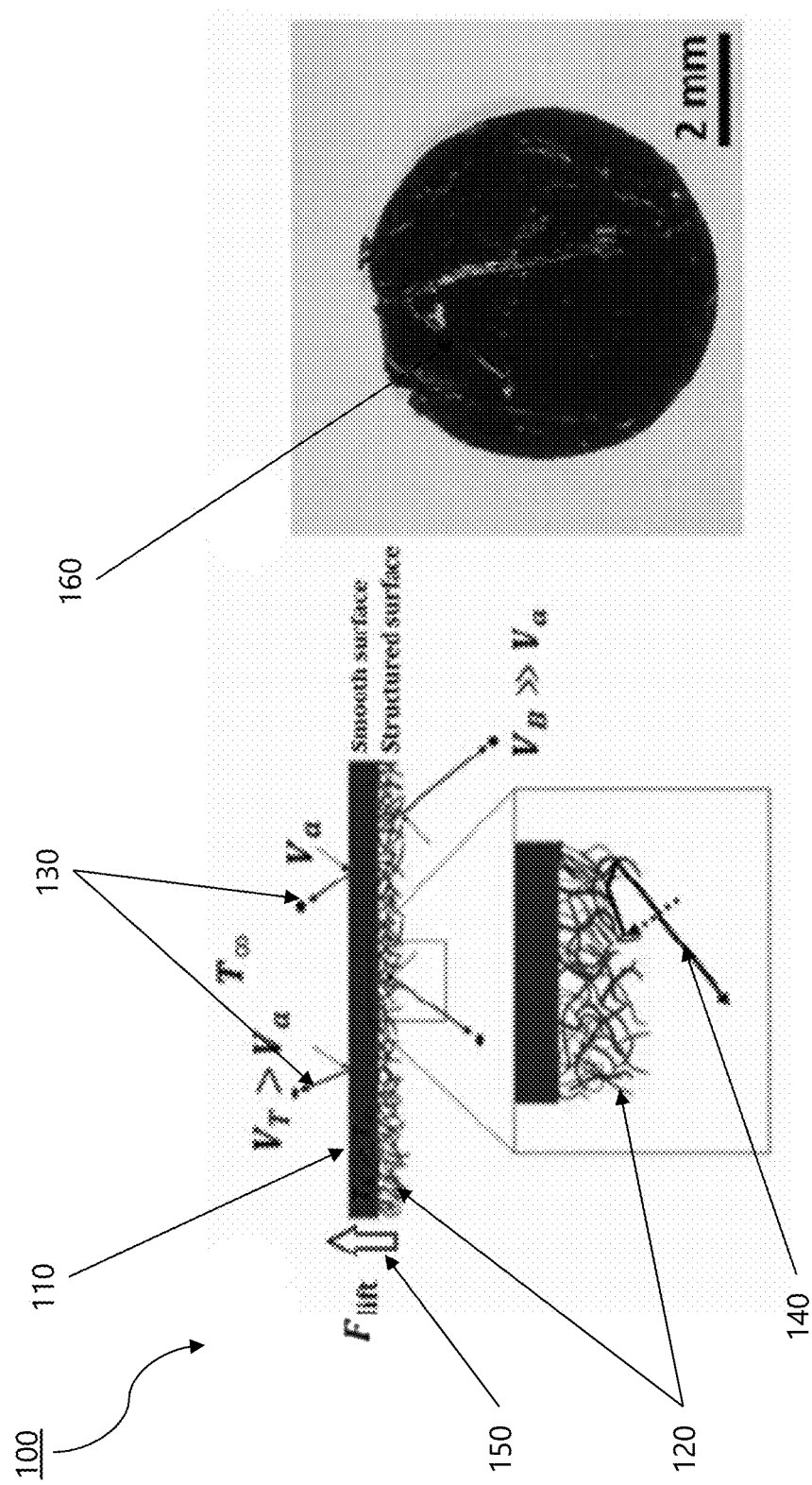
FIGS. 1A-1B illustrate a structure according to one embodiment of the disclosed subject matter.

FIGS. 1A-1B illustrate an exemplary structure 100 comprising a sheet side 110, having a structured side 120. In FIG. 1A, a plurality of gas particles 130, 140 can be incident on either surface. Each of the plurality of gas particles 130, 140 collides with one of the surfaces. Gas particles incident on the structured side 140 can exit the structure with a velocity greater than the gas particles incident on the sheet side 110, resulting in a net recoil force 150. This net recoil force 150 can cause levitation in the exemplary structure 100. In certain embodiments the sheet side 110 can include a BoPET film 160 and the structured side 120 can include carbon nanotubes 1B).

In certain embodiments the structured side 120 can provide rigidity to the structure 100, includes several advantages that would be recognized by persons or ordinary skill in the art. For the purpose of example, and not limitation, the rigidity can reduce or eliminate deformation of the structure 100 which can result from application of a force or pressure. This force or pressure can result from uneven application of the net recoil force 150 across the structure, or, alternatively, from a plurality of external forces, including, for example, environmental forces or differential thermal expansion.

In certain embodiments, the net recoil force is produced in an upward direction by a new momentum transfer between the sample and the incident gas molecules. In such embodiments, the levitation is not caused by a temperature difference between the top and bottom surfaces of the structure, but rather due to the difference in thermal accommodation coefficients between the top and bottom surfaces. The force generated by the difference in thermal accommodation coefficients (Act-force) can be in excess of the force needed to lift the structure, and thus additional components, for example cameras or other sensors, can be attached to the structure to provide greater functionality. In the free-molecular regime, Act-force can increase proportionally with pressure, and can reach a maximum when the Knudsen number (that is, the ratio of the mean free path to the size of the structure) is approximately 1. Since Act-force is generated primarily through the collision of molecules, an increase in pressure can reduce the Act-force. Further, various simulations can be used to predict the different force components of the resultant Act-force. In certain embodiments, Monte Carlo simulations or numerical solutions of the Boltzmann equation can provide further insight into the force generated from Act-force.

In certain embodiments, either the sheet side 110 or the structured side 120 or both can comprise one or more ultrathin materials. For example, and not limitation, ultrathin materials can include materials with a thickness of between 1 and 100 nanometers.

Figure 2:
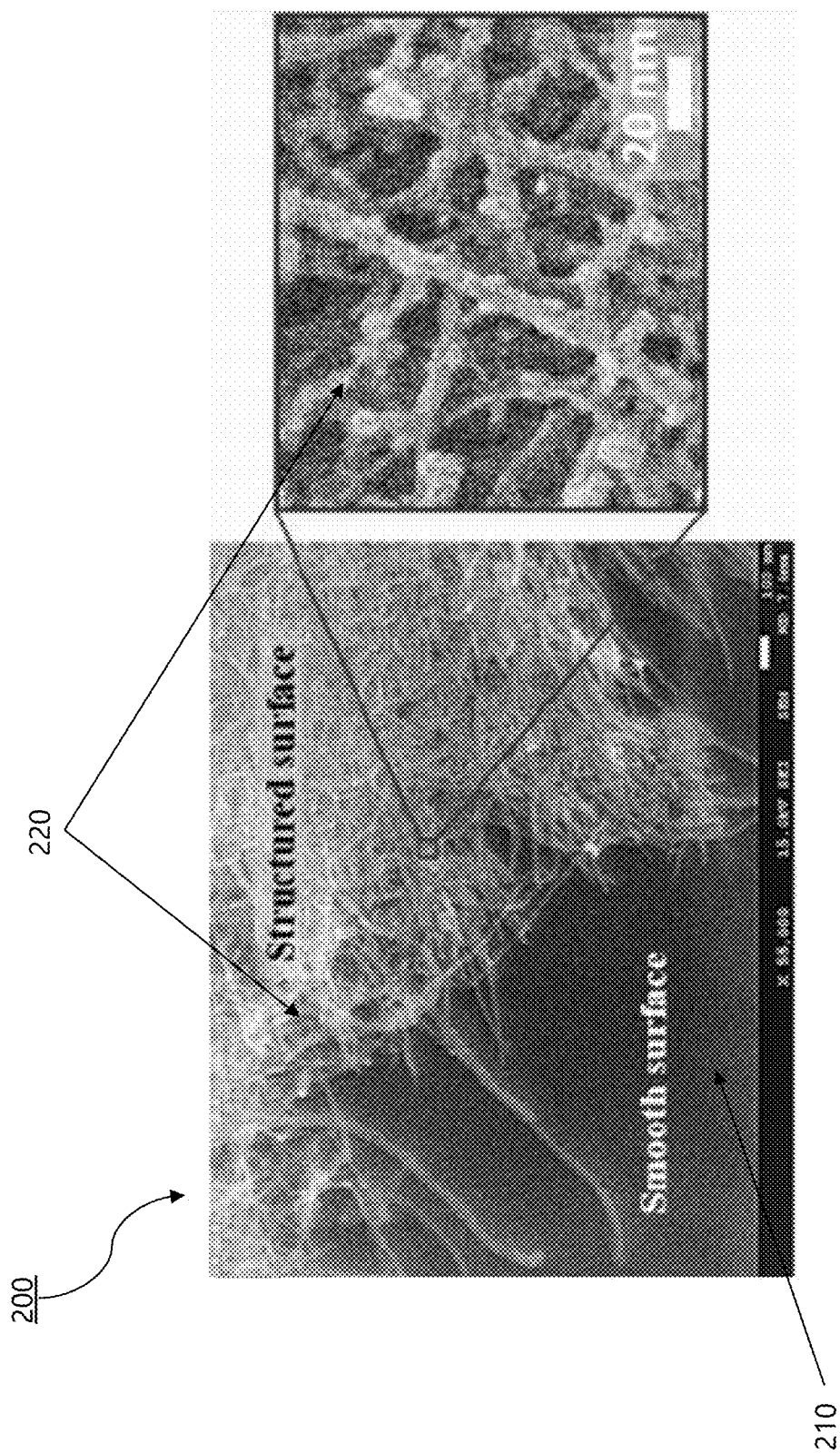
FIG. 2 illustrates an enhanced view of a carbon nanotube layer.

FIG. 2 illustrates an exemplary embodiment of a structured material 200 according to the present embodiments. A smooth surface 210 is provided which can be a BoPET film or other similar material. Onto this smooth surface 210 can be deposited a structured surface 220. In certain embodiments, this structured surface 220 can include a carbon nanotube solution which is dropcast onto the smooth surface 210. The structured surface 220 can be configured to trap incoming gas molecules or otherwise inhibit their movement, resulting in multiple gas-CNT collisions and better thermal accommodation of the incident gas molecules than for corresponding incoming gas molecules on the smooth side. In certain embodiments, the carbon nanotube solution can include a 0.2 weight % water-based single-wall carbon nanotube (with 1-2 nanometer diameter and 5-30 micrometer length) diluted with deionized water by a volumetric ratio of 3:1. The BoPET sheet can then be placed on a silicon wafer, and heated to a temperature of 50 degrees Celsius. The carbon nanotube solution is then placed on the heated BoPET sheet, allowing the water to evaporate, and resulting in the structured material 200.

In certain free-molecular regimes, gas molecules colliding with a heated structure absorb energy from the structure and can leave with a higher average temperature. The measure of this energy transfer is known as the thermal accommodation coefficient, and can be represented by the equation:

$$\alpha = \frac{T_r - T_i}{T_s - T_i} \quad (2)$$

Wherein, $T_r$ can represent the temperature of departing gas molecules, $T_s$ can represent the temperature of the structure, and $T_i$ can represent the temperature of the incident molecule.

This carbon nanotube ("CNT") layer 220 can act as a lightweight light absorber (with, for example, absorptivity of ~90%) while also increasing the structural stability of the resultant structure, for example, by providing rigidity to the resultant structure. In such an embodiment, the CNT layer 220 can tend to trap incoming gas molecules 130, which can allow the gas molecules 130 to collide with the CNT layer 220 several times before exiting and to absorb more heat from the structure before exiting. As a result, the thermal accommodation coefficient for the CNT layer 220 of the resultant structure can be higher than the BoPET layer 210 of the resultant structure, resulting in a lift force being generated. Light absorber materials with less absorptivity (for example 80%) or greater absorptivity (for example 99%) are also contemplated.

In certain embodiments, the smooth surface 210 comprises a surface which is configured to reflect all or substantially all incident particles 130 without trapping or otherwise impairing reflection of the incident particles 130. In certain embodiments, the smooth surface 210 can reflect about 100% of the incident particles without trapping or otherwise impairing reflection of the incident particles 130, resulting in the lowest potential accommodation coefficient. In certain embodiments, the smooth surface 210 can reflect less than 100% of the incident particles without trapping or otherwise impairing the incident particles 130. In certain exemplary embodiments, the smooth surface 210 can reflect a first portion of incident particles 130 without trapping or otherwise impairing reflection of the incident particles 130, wherein the structured surface 220 can reflect a second portion of incident particle 130, with trapping or otherwise impairing at least a portion of the incident particles 130.

Figure 3:
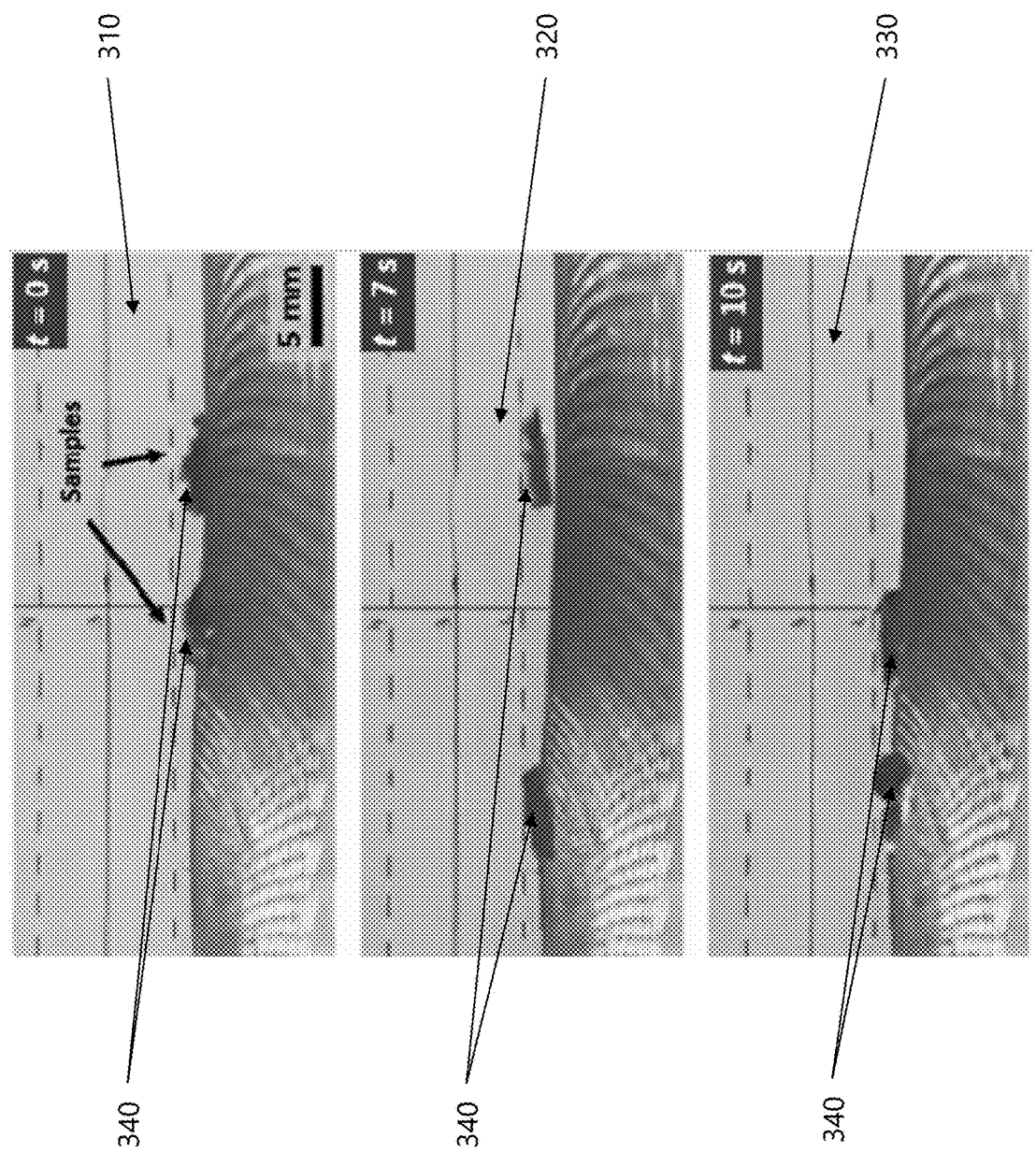
FIG. 3 illustrates sequential levitation of multiple samples, according to certain embodiments of the disclosed subject matter.

FIG. 3 illustrates a sequence of photos showing a sample according to the present embodiments that is levitated using a photophoretic effect. As shown in 310, at zero seconds, the samples 340, which have not been irradiated and have no achieved thermal equilibrium, do not levitate and rest at the bottom of the test chamber. As shown in 320, at seven seconds, the samples 340 have achieve lift due to the net recoil force 150 produced by the photophoretic effect. Finally, as shown in 330, the samples 340, after light is no longer applies, no longer levitate, and so fall to the bottom of the test chamber again.

Figures 4A, 4B:
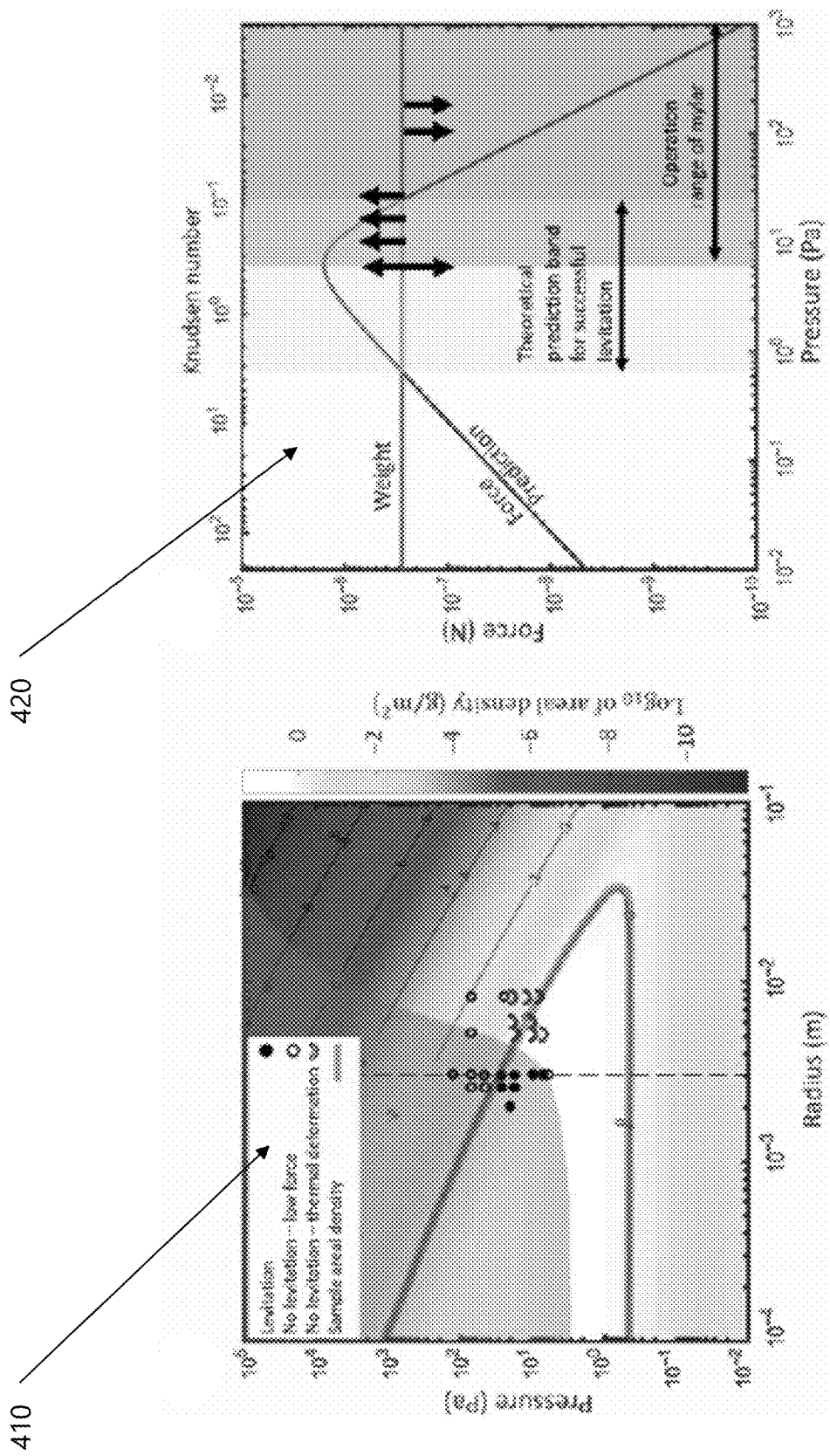
FIGS. 4A-4B illustrate predicted and experimental results of levitation of BoPET disks according to certain embodiments of the disclosed subject matter.

FIGS. 4A-4B show the results of a series of exemplary tests of the system according to certain disclosed embodiments. As shown in 410 (FIG. 4A), using a Δα-force with Δα=0.15±0.05 and a flux of ~0.5 W/cm², an object of various sample areal densities can be levitated. Additionally, as shown in 420 (FIG. 4B), the pressure-dependent lift force, as compared to the weight of the sample, can provide lift up to a limited pressure, as pressures beyond that limit can result in distortion of the sample and reduction in the lift force.

In certain embodiments, various other components can be attached to the structured material, without inhibiting the ability of the material to achieve lift. These components can include, for example and not limitation, electronic components, mechanical components, computer components, and sensor components. As further examples, the structured material can also contain one or more cameras, one or more sensors, one or more thermometers, one or more wings, and/or one or more payloads. The inclusion of different components can allow the structured materials to achieve a variety of different functions, including, but not limited to, surveillance, weather monitoring, video recording, navigation, and/or measuring.

Figures 5A, 5B:
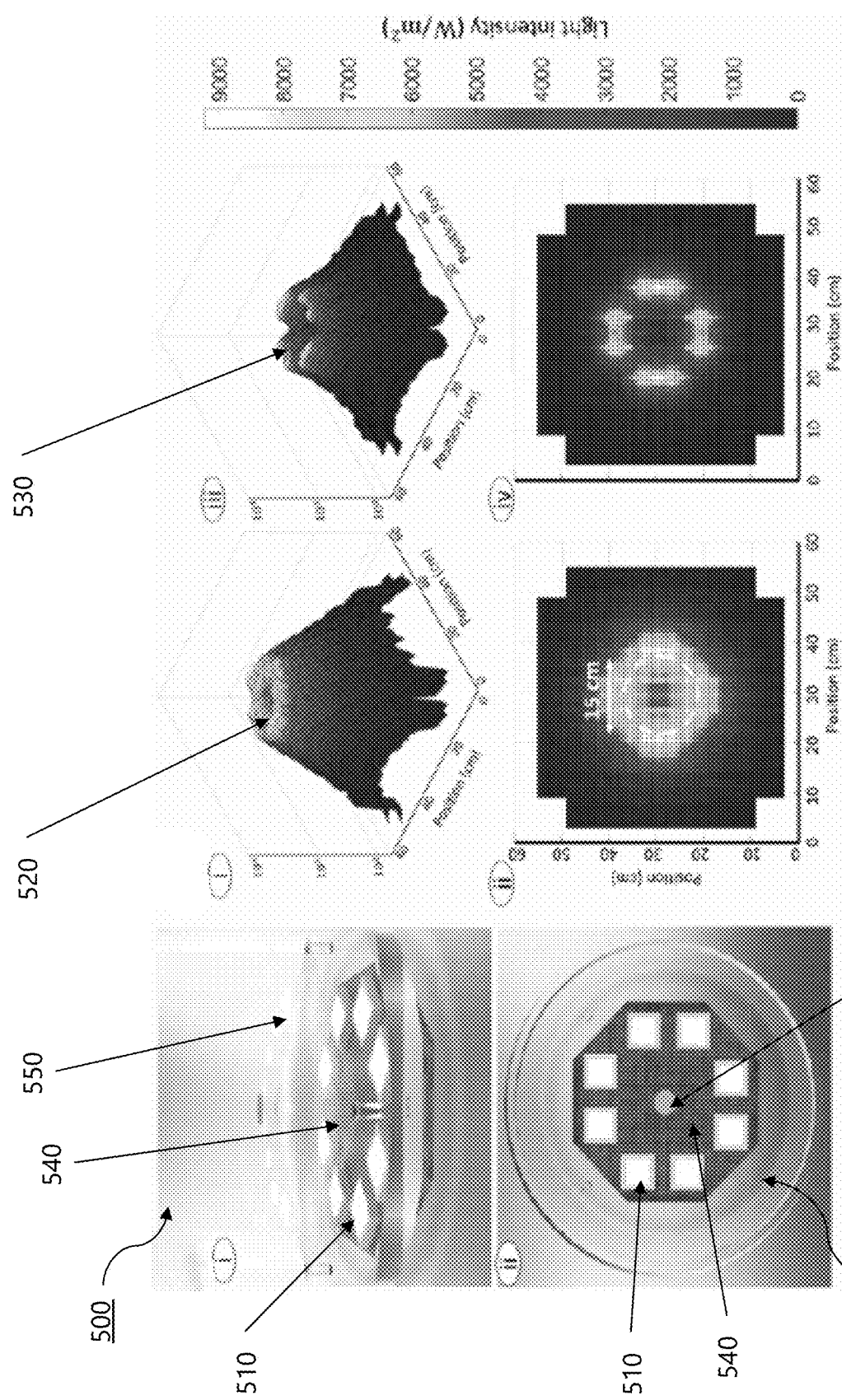
FIGS. 5A-5B illustrate an exemplary light trap according to certain embodiments of the disclosed subject matter.
Figure 6A:
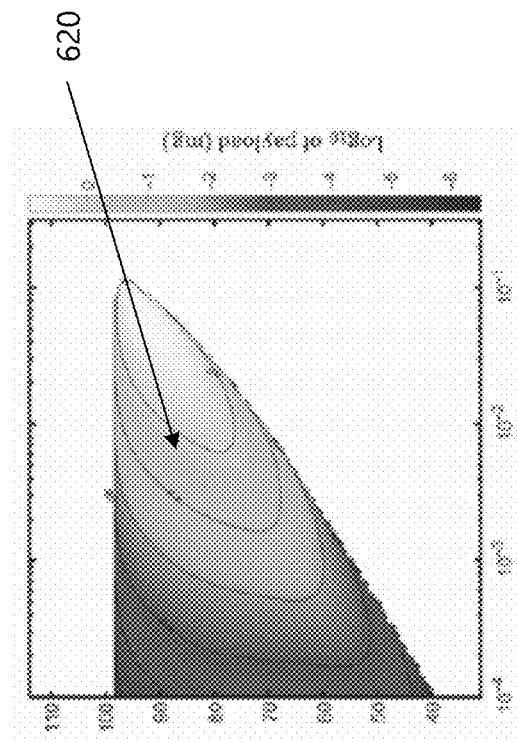
FIGS. 6A-6D illustrates predicted flight paths of certain embodiments according to various factors.
Figure 6B:
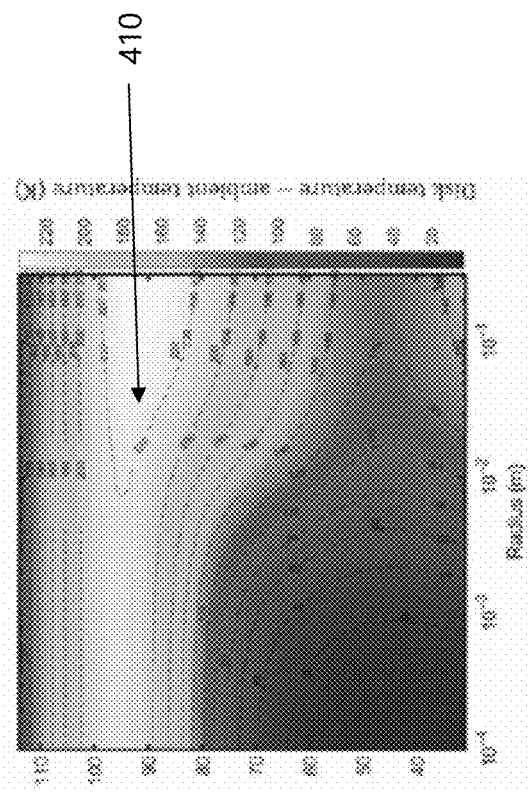
Figure 6C:
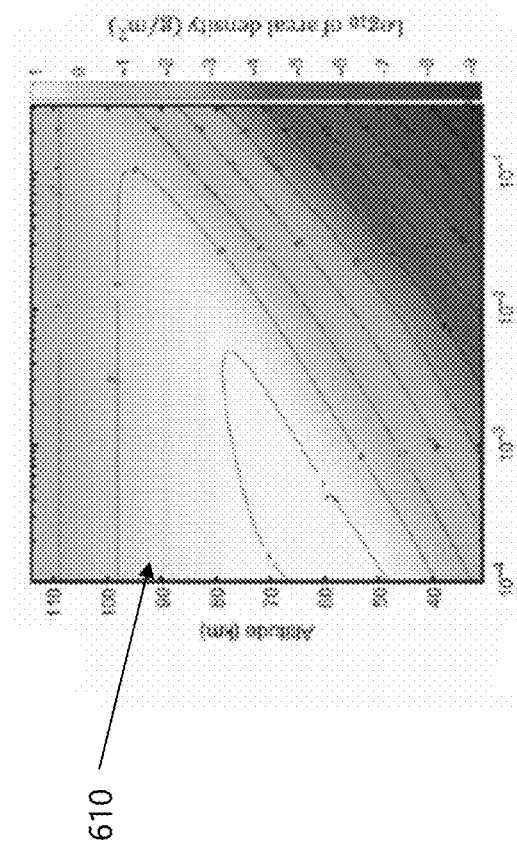
Figure 6D:
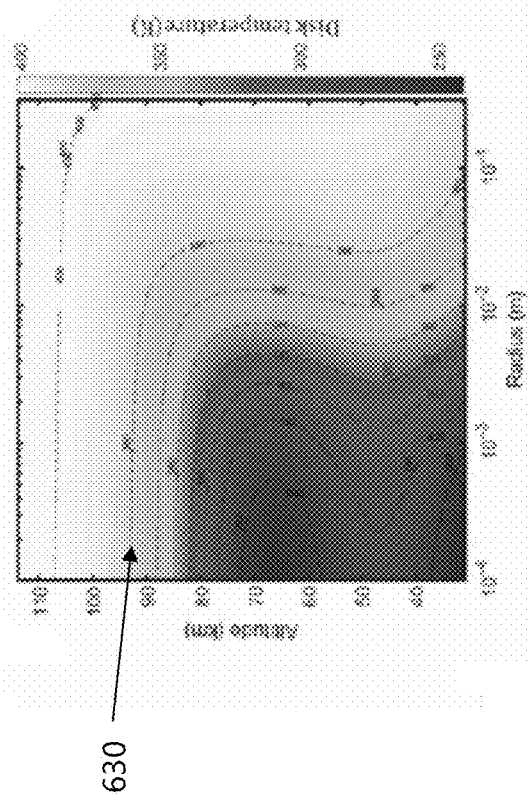

FIGS. 5A-5B show an exemplary light trap system 500 according to certain embodiments. According to certain embodiments, the light trap 500 can include a plurality of LEDs 510 located beneath a test chamber 550. Within the test chamber (FIG. 5A), a partially transparent mesh 540 can be placed above the bottom surface of the test chamber. On top of this transparent mesh 540 a test sample 560 can be placed. This test sample 560 can then be illuminated by the LEDs 510, resulting in levitation of the test sample 560. As shown in 520 and 530 (FIG. 5B), the intensity of light from the LEDs 510 can be significantly greater at 7 centimeters above the LEDs 510 (as shown in 520) than at 10 centimeters above the LEDs (shown in 530).

FIGS. 6A-6D shows a plurality of contour plots which can represent the potential altitude reached by a sample which is levitated according to various variables. For example, and not limitation, 610 (FIG. 6A) shows a contour plot having an x-axis measuring radius of a sample disk, a y-axis measuring altitude which can be achieved, and contour shades showing $\log_{10}$ of the areal density of the disk. 620 (FIG. 6B) shows a contour plot having an x-axis measuring radius of a sample disk, a y-axis measuring altitude which can be achieved, and contour shades showing $\log_{10}$ of an exemplary payload mass (in milligrams). For example, and not limitation, 630 (FIG. 6C) shows a contour plot having an x-axis measuring radius of a sample disk, a y-axis measuring altitude which can be achieved, and contour shades showing sample disk temperature (in Kelvin). 640 (FIG. 6D) shows a contour plot having an x-axis measuring radius of a sample disk, a y-axis measuring altitude which can be achieved, and contour shades showing the difference between disk temperature and ambient temperature (in Kelvin).

Figure 7C:
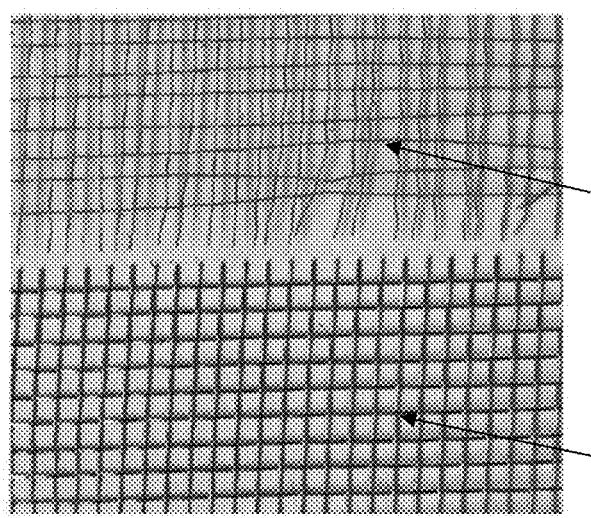
FIGS. 7A-7C illustrate an example chamber in accordance with certain embodiments of the disclosed subject matter.
Figure 7B:
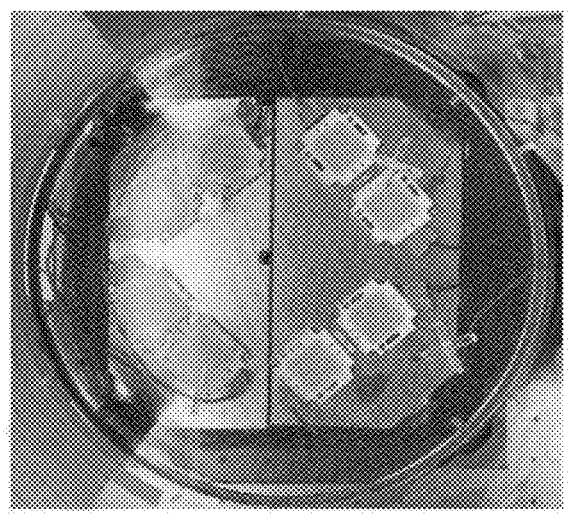
Figure 7A:
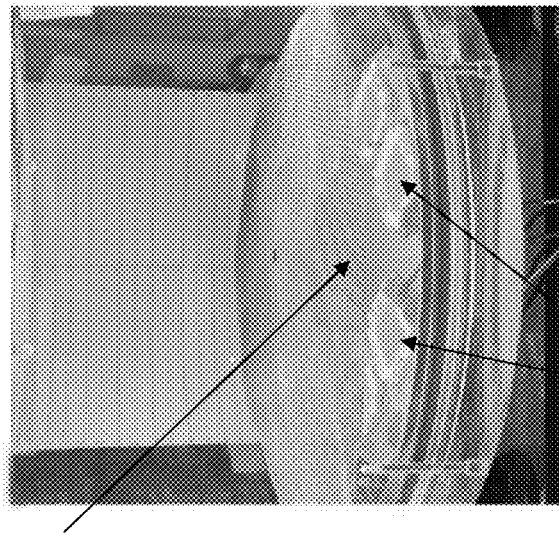

FIGS. 7A-7C show an example chamber. FIG. 7A shows a side view of chamber 700 and samples 701. FIG. 7B shows a top view of the setup with the 8 arrays of the LED light ring and 74% transparent mesh. FIG. 7C shows 74% (left, 702) and 85% (right, 703) transparent meshes.

The disclosed subject matter provides various models for developing air levitation of a target structure. For example, the disclosed subject matter provides a theoretical model that can be used for the development of mid-air levitation of a target structure based on the heat transfer between the structure and environment. In this model, the heat transfer analysis can be performed for the entire range of pressure. The temperature distribution of the surface of the target structure can be identified to find the temperature of the gas molecules impinging on and reflecting from the surface. Then, the total amount of force experienced by the target structure (e.g., a disk) with two different surface properties on either side can be identified.

In certain embodiments, the disclosed subject matter provides a heat transfer model. Force generation in free molecular and continuum regimes obey distinct physics. Hence, the disclosed heat transfer model can be configured to properly describe the physical phenomena in both regimes. The heat transfer model can assess the energy balance for a target structure (e.g., a disk) and derive the equations for the surface temperature of the disk. In the disclosed model, the structure (e.g., disk) is absorbing radiation on one side and dissipating heat on both sides via radiation, convection, and/or conduction. In non-limiting embodiments, air can be considered an ideal gas with the properties listed below:

Heat capacity at constant pressure:

$$C_p\left[\frac{kJ}{kgK}\right] = 28.11 + (0.1956 \times 10^{-2})T[K] + (0.4802 \times 10^{-5})T[K]^2 - (1.966 \times 10^{-9})T[K]^3, \quad (3)$$

thermal conductivity:

$$k_{air}\left[\frac{W}{mK}\right] = (0.238 \times 10^{-3})T[K]^{0.8218}, \quad (4)$$

thermal diffusivity (D), thermal expansion coefficient ($\beta$), dynamic viscosity ($\mu$), and density is given, respectively, by:

$$D = \frac{k_{air}}{\rho c_p}, \beta = \frac{1}{T_0}, \mu = \mu_o\left(\frac{T}{T_0}\right)^{2/3}, \text{ and } \rho = \frac{P}{R_{air}T}, \quad (5)$$

where T is the temperature, $T_0$=273 K is the reference temperature, $\mu_0$=1.716×10$^{-5}$ Pa·s is dynamic viscosity at the reference temperature, P is the pressure, and $$R_{air} = \frac{R_u}{M_{air}} = 287.1 \frac{J}{kgK}$$

is the ideal gas constant for air, obtained from the universal gas constant $$R_u = 8.314 \frac{J}{molK}$$

and the molar mass of air $$M_{air} = 0.02896 \frac{kg}{mol}.$$

The incident energy can be absorbed on one side of the disk and can be balanced by the total heat transfer from the disk, which includes radiation and conduction/convection terms:

$$Q_{inc} = Q_{rad} + Q_{cc}. \quad (6)$$

Here, $$Q_{inc} = \frac{I_{inc}S}{2},$$

where $1_{inc}$ is the incident flux shone on one side of the disk and S=2$\pi$a$^2$ is the total surface area of the disk. In non-limiting embodiments, the disk can be assumed to have a uniform temperature, $T_s$, which can be a reasonable approximation when it is compared to the results of finite-element simulations in COMSOL under a variety of conditions. The radiative heat transfer from both sides of the disk can be then given by:

$$Q_{rad} = S\sigma\varepsilon(T_S^4 - T_\infty^4), \text{ where } \sigma = 5.67 \times 10^{-8} \frac{W}{m^2K^4}, \quad (7)$$

$\varepsilon$ is the emissivity of the surface and is assumed to be 0.95 for the disclosed models (consistent with the temperature measurements of the disks using a thermal infrared camera), and $T_\infty$ is the ambient temperature.

In the free molecular regime, the conduction heat transfer for a disk with a total area S can be given by:

$$Q_{fm} = h_{mol}S(T_s - T_\infty), \quad (8)$$

In equation (8), the molecular heat transfer coefficient $$h_{mol} = \frac{\overline{\alpha}}{8}\frac{\gamma+1}{\gamma-1}\frac{P\overline{v}}{T}$$

was used with the average thermal accommodation coefficient of the top and bottom sides of the disk $$\overline{\alpha} = \frac{\alpha_{top} + \alpha_{bottom}}{2},$$

the adiabatic constant $$\gamma = \frac{C_P}{C_V} = \frac{C_P}{C_P - R},$$

and the average speed of gas molecules $$\overline{v} = \sqrt{\frac{8k_BT}{\pi m}} = \sqrt{\frac{8R_{air}T}{\pi}},$$

where $k_B$ and m are the Boltzmann constant and molecular mass of the gas molecules. In calculating $C_P$, $C_V$, $k_{air}$ and $\overline{v}$, the temperature can be the average temperature between ambient temperature $T_\infty$ and the surface temperature $T_s$.

In the continuum regime, the convection/conduction heat transfer can be written as $$Q_{cont} = Nu \, a\pi k_{air}(T_s - T_\infty), \quad (9)$$

with Nu=0.417Ra$^{0.25}$+8/$\pi$. The Rayleigh Number can be given by $$Ra = g\beta(T_s - T_\infty)\frac{\rho d^3}{\mu D},$$

where g is gravitational acceleration, d is the diameter of the disk, $\rho$ is density, and $\alpha$, $\beta$, and $\mu$ are defined in equation 5. Equation (5) includes a constant term 8/$\pi$ representing conduction and a pressure-dependent term representing advection $0.417Ra^{0.25}$, which scales with pressure as $Q_{adv} \propto Ra^{0.25} \propto (P^2)^{0.25} \propto P^{0.5}$ and vanishes in the free molecular regime (P→0).

Interpolating between the free-molecular and continuum regimes, the following expression can be obtained for the convection/conduction term valid for all pressures:

$$Q_{cc} = \frac{1}{1/Q_{fm} + 1/Q_{cont}}. \tag{10}$$

By inserting the three heat transfer mode equations (7) and (10) into equation (6), the temperature of the surface of a disk, $T_s$, numerically as a function of radius, pressure, and incident intensity can be identified.

Force Formulation model: The photophoretic force acting on a disk with a temperature difference between the top and bottom sides can be defined as $\Delta$ T-force. Modifying the surface to achieve different accommodation coefficients on the top and bottom can result in a force on the same order of magnitude (i.e., $\Delta\alpha$-force). Surface modification for a thin lightweight disk can be simpler than fabricating thicker ultralight structures with decreased thermal conductivity, such as nano cardboard.

In both the free molecular regime and the continuum regime, due to the similar physical origin of the photophoretic force, the net force on the structure can be expressed as $$F = \Delta\theta(P)\psi(P), \tag{11}$$

where $\Delta\theta$ is the temperature variation of gas molecules next to the surface, and $$\psi\left[\frac{N}{K}\right]$$

represents the force per unit change in temperature of the colliding molecules. $\Delta\theta(P)$ and $\psi(P)$ are both functions of pressure. Equation (11) is based on the interaction between the disk surface and the gas molecules next to the surface.

Free Molecular Regime: In the free molecular limit with Kn→∞, the average temperature of the gas molecules next to the surface is approximated as $$\theta = \frac{1}{2}(T_i + T_r),$$

in which $T_i$ and $T_r$ are temperatures of the gas molecules before and after the collision, respectively. $\theta$ can be defined using the definition of thermal accommodation coefficient between gas molecules and surface, $$\alpha = \frac{T_r - T_i}{T_s - T_i},$$

which can result in $$\theta = T_i + \frac{1}{2}\alpha(T_s - T_i).$$

Thus, the temperature variation between the two sides of the disk can be:

$$\Delta\theta(P) = \frac{1}{2}\Delta\alpha(T_s - T_i), \tag{12}$$

for a disk with an accommodation coefficient difference of $\Delta\alpha = \alpha_{bottom} - \alpha_{top}$. In this condition, the collision of gas molecules with a surface can be far more probable than the collision of gas molecules with each other hence the temperature of gas molecules before colliding with a surface can be equal to far-field temperature, or $T_i = T_\infty$. The force can be found in the free molecular regime with Kn→∞. The derivation can start by finding the force due to the momentum transfer between the gas molecules and the surface. Assuming a uniform temperature across the thickness of the disk and an accommodation coefficient difference of $\Delta\alpha$, the Maxwell distribution, $f(v)$, can be integrated over the entire range of velocity and assume an area of $\pi a^2$ and volume of V of the air with N number of gas molecules. The net force on one side can be:

$$<F> = \pi a^2 N \int_0^\infty \left\{\frac{(2mv)f(v)v}{V}\right\} dv \tag{13}$$

and molecule flux of $$<J> = \frac{N}{V}\int_0^\infty f(v)v \, dv \tag{14}$$

representing the flux of air molecules hitting and reflecting from the surface. In these relations, $f(v)$ is Maxwell distribution and is defined by:

$$f(v) = \left(\frac{m}{2\pi kT}\right)^{1/2} e^{\frac{-mv^2}{2kT}}. \tag{15}$$

This approach results in the following net $\Delta\alpha$-force on a thin plate with uniform temperature and different accommodation coefficients on two sides:

$$F_{fm} = \frac{\pi a^2}{4T_\infty} P\Delta\alpha(T_s - T_\infty). \tag{16}$$

Equation (16) represents a linear increase with pressure, which is valid when the air molecules do not collide with each other as frequently as they do with the surface (Kn>>1).

Continuum Regime: The derivation of the photophoretic force acting on a sphere can be extended to the case of an oblate spheroid and then take the limit to approach a flat disk with negligible thickness. In order to find the force for the entire range of pressure, equation (11) can be used. Knowing the temperature solution from the heat transfer model, $\Delta\theta(P)$ can be identified and then an expression for the force can be derived.

Continuum regime, part A: constructing $\Delta\theta(P)$: For an oblate spheroid with semi-axes a and b (a>b), similar to the free molecular regime, the average temperature of the gas molecules next to the surface in the continuum regime can be approximated as $$\theta = \frac{1}{2}(T_i + T_r) = T_i + \frac{1}{2}\alpha(T_s - T_i).$$

In the case of the spheroid, mathematical modeling can disallow for a discontinuity in the value of the accommodation coefficient. Thus, in order to achieve a smooth transition from one value of accommodation coefficient to the other instead of the two constant accommodation coefficients on the two sides, the variation of the accommodation coefficient over the surface of the spheroid can be approximated by the Legendre expansion:

$$\alpha = \Sigma a_n P_n(\cos \eta) = a_0 + a_1 \cos \eta + \ldots \quad (17)$$

Finding the coefficient of the Legendre expansion can give $$a_0 = \frac{\alpha_{top} + \alpha_{bottom}}{2} \text{ and } a_1 = \frac{3}{4}\Delta\alpha.$$

The amplitude of temperature variation along the surface, $\Delta\theta$, of the spheroid can be expressed as:

$$\Delta\theta = \frac{3}{8}\Delta\alpha(T_s - T_i). \quad (18)$$

In order to express $(T_s - T_i)$ in terms of $(T_s - T_\infty)$, a form for the conductive heat transfer can be constructed from the disk as a function of $(T_s - T_\infty)$, then the amount of heat being removed from the surface by the interaction of the surface with the gas molecules with $T_i$ can be equated as their initial temperature right before colliding with the surface. This heat transfer can be expressed by [50,51].

$$\frac{dQ}{dS} = h_{mol}(T_s - T_i), \quad (19)$$

with $dS$ being the surface area element, and $h_{mol}$ molecular heat transfer coefficient defined above. Note that equation (19) holds for the entire range of pressure because the conduction from the surface to the adjacent gas molecules directly on the surface happens via molecular interaction. Once Q is found as a function of $(T_s - T_\infty)$, equation (18) can be used to find $(T_s - T_i)$ which gives $\Delta\theta$ according to equation (18).

Figure 9:
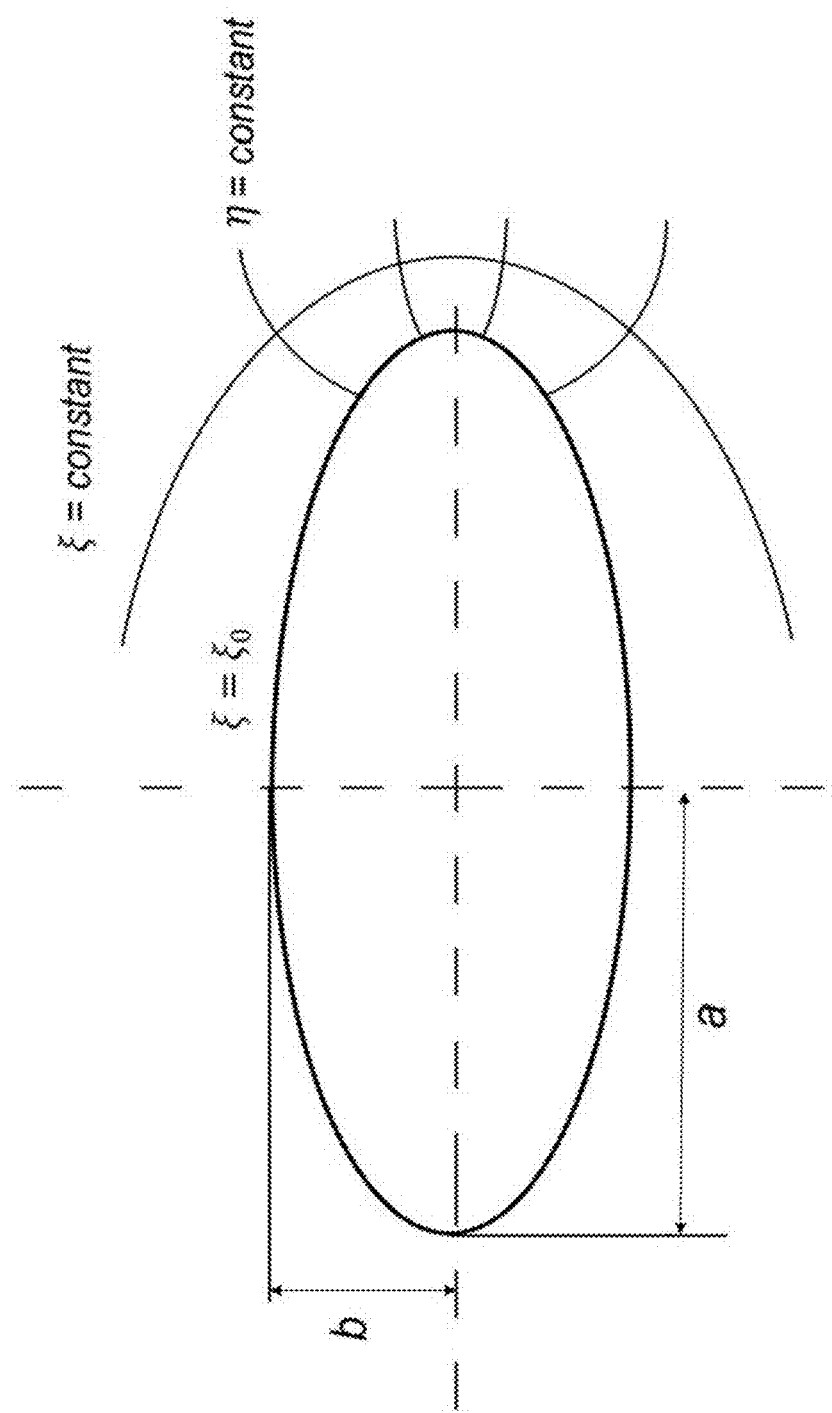
FIG. 9 illustrates an example spheroidal coordinate in accordance with certain embodiments of the disclosed subject matter.

In the continuum regime, $Q_{cond,co}$ does not have a trivial solution for a spheroid. The problem of steady heat conduction can set up around a spheroid of surface temperature $T_s + \Delta\theta \cos(\eta)$, which can be a superposition of a uniform value and a surface varying component with $\eta$ as the polar angle of the spheroid, in a medium of ambient temperature $T_\infty$ and without volumetric heat generation within the spheroid. The governing equation can be:

$$\frac{1}{\cosh\xi}\frac{\partial}{\partial\xi}\left[\cosh\xi\frac{\partial T}{\partial\xi}\right] + \frac{1}{\sin\eta}\frac{\partial}{\partial\eta}\left[\sin\eta\frac{\partial T}{\partial\eta}\right] = 0, \quad (20)$$

where $\xi$ and $\eta$ are radial and angular parts of spheroidal coordinates (see FIG. 9). The boundary conditions for this problem can be:

$$T = T_s + \Delta\theta\cos(\eta) \text{ at } \xi = \xi_0 \left(\text{surface of the spheroid}, \xi_0 = \tanh^{-1}\frac{b}{a}\right), \quad (21)$$

$$T = T_\infty \text{ as } \xi \to \infty.$$

The temperature solution for equation (16) with boundary conditions shown in (21) becomes:

$$T(\xi, \eta) - T_\infty = \qquad (22)$$

$$(T_s - T_\infty)\frac{\tan^{-1}(\sinh\xi) - \frac{\pi}{2}}{\tan^{-1}(\sinh\xi_0) - \frac{\pi}{2}} + \Delta\theta\cos(\eta)\frac{\sinh(\xi)\left(\tan^{-1}(\sinh\xi) - \frac{\pi}{2}\right) + 1}{\sinh(\xi_0)\left(\tan^{-1}(\sinh\xi_0) - \frac{\pi}{2}\right) + 1}.$$

The local amount of heat transfer can be found using solution (22) and its proper boundary conditions:

$$[\nabla T]_{\xi=\xi_0} = \frac{1}{l}\left[\frac{\partial T}{\partial\xi}\hat{e}_\xi + \frac{\partial T}{\partial\eta}\hat{e}_\eta\right]_{\xi=\xi_0} = \qquad (23)$$

$$\frac{1}{l}\left[(T_s - T_\infty)\frac{1}{\cosh\xi_0\left\{\tan^{-1}(\sinh\xi_0) - \frac{\pi}{2}\right\}}\hat{e}_\xi - \Delta\theta\sin(\eta)\hat{e}_\eta\right]$$

with $l = \sqrt{(a^2-b^2)(\sinh^2\xi_0+\cos^2\eta)}$. The normal component of the temperature gradient due to a surface-varying component of the temperature is not included in (23) since its integration over the surface of the spheroid is zero. Thus, the total heat flow from the surface of the oblate spheroid can be:

$$Q_{cond,co} = \int(-k_{air}\nabla T \cdot \hat{e}_\xi)dS = \frac{8\pi ak_{air}(T_S - T_\infty)}{sh}, \quad (24)$$

where, $sh$ is a shape factor that depends solely on the geometry of the sample and defined as:

$$sh = \frac{(\pi - 2\tan^{-1}(\sinh\zeta_0))}{\cosh\xi_0}. \quad (25)$$

In the two limiting cases of disk and sphere, the shape factor reduces to:

$$\lim_{\frac{b}{a}\to 0}(sh) = \pi \text{ for a disk.} \quad (26)$$

$$\lim_{\frac{b}{a}\to 1}(sh) = 2 \text{ for a sphere.} \quad (27)$$

In the case of a disk, equation (24) reduces to: $Q_{cond,co} = 8ak_{air}(T_s - T_\infty)$ which can be the conductive term in equation (9). By relating this heat conduction from the disk to the total heat transfer from (19), the following question can be identified:

$$h_{mol}(T_s - T_i)2\pi a^2 = 8ak_{air}(T_s - T_\infty), \quad (28)$$

thus, the temperature difference in equation (18) reduces to:

$$\Delta\theta_{disk} = \frac{3}{2\pi}\frac{k_{air}}{ah_{mol}}\Delta\alpha(T_s - T_\infty). \quad (29)$$

Continuum regime, part B: developing the force formula, $F = \Delta\theta(P)\psi(P)$: The photophoretic force on a particle in continuum regime can be caused by thermal creep. When the gas over a surface has a tangential temperature gradient, it flows over the surface from the cooler side to the hotter side with slip velocity, $v_s$, defined by:

$$v_s = k_s \frac{\mu_{air}}{\rho T_\infty} \nabla_s T, \quad (30)$$

where $\kappa_s = 1.14$ is thermal slip coefficient, $\mu$ is viscosity, $\rho$ is density, and $\nabla_s T$ is the tangential temperature gradient in the gas layer. Using (23), the following equation can be derived:

$$\nabla_s T = -\frac{\Delta\theta}{\sqrt{(a^2 - b^2)(\sinh^2\xi_0 + \cos^2\eta)}}\sin(\eta)\hat{e}_\eta. \quad (31)$$

In order to calculate the force, the Lorentz reciprocal theorem can be for the Stokes flow. The migration velocity of the spheroidal particle along its symmetry axis can be identified by the following equation:

$$U = -\frac{1}{4\pi ba^2}\int (n\cdot r)(v_s \cdot \hat{e}_z)dS = \quad (32)$$

$$\frac{\kappa_s \mu}{\rho T_\infty}\frac{\Delta\theta}{a}\sinh\xi_0\cosh\xi_0\left(\frac{\cosh^2\xi_0}{\sinh\xi_0}\tan^{-1}\left(\frac{1}{\sinh\xi_0}\right) - 1\right)$$

By taking the limit of $$\frac{b}{a} \to 0,$$

the value or migration velocity for a disk can be:

$$U_{disk} = \frac{\pi\kappa_s\mu_{air}}{2a\rho T_\infty}\Delta\theta = \quad (33)$$

$$\frac{\pi\kappa_s\mu_{air}}{2a\rho T_\infty}\frac{3}{2\pi}\frac{k_{air}}{a\frac{\overline{\alpha}\gamma + 1P\overline{v}}{8\gamma - 1T}}\Delta\alpha(T_s - T_\infty) = \frac{6\kappa_s\mu T_s k_{air}}{a^2\rho P\overline{v}}\frac{\gamma - 1}{\gamma + 1}\frac{\Delta\alpha}{\overline{\alpha}}\frac{(T_s - T_\infty)}{T_\infty}.$$

Using kinetic theory of gases, $$k_{air} = fC_v\mu_{air} \text{ and } \mu_{air} = \frac{1}{2}\overline{v}\rho\lambda$$

can be substituted, where the standard definition can be used for the mean free path $$\lambda = \frac{\mu_{air}}{P}\sqrt{\frac{\pi R_{air} T}{2}},$$

the f-factor can be given by $$f = 1 + \frac{9R_{air}}{4C_v} = 1 + \frac{9}{4}(\gamma - 1),$$

and substituted $$\frac{R}{C_v} = \frac{C_p - C_v}{C_v} = \frac{C_p}{C_v} - 1 = \gamma - 1.$$

The resulting expression can be:

$$U_{disk} = \overline{v}\frac{\kappa_s f \rho T_s C_v}{P}\left(\frac{\lambda}{a}\right)^2\frac{\gamma - 1}{\gamma + 1}\frac{\Delta\alpha}{\overline{\alpha}}\frac{T_s - T_\infty}{T_\infty} = \quad (34)$$

$$\overline{v}\kappa_s f\frac{C_v}{R_{air}}\left(\frac{\lambda}{a}\right)^2\frac{\gamma - 1}{\gamma + 1}\frac{\Delta\alpha}{\overline{\alpha}}\frac{T_s - T_\infty}{T_\infty} =$$

$$\overline{v}\kappa_s f\left(\frac{\lambda}{a}\right)^2\frac{1}{\gamma + 1}\frac{\Delta\alpha}{\overline{\alpha}}\frac{T_s - T_\infty}{T_\infty} = \overline{v}\kappa_s\left(\frac{\lambda}{a}\right)^2\frac{1 + \frac{9}{4}(\gamma - 1)}{\gamma + 1}\frac{\Delta\alpha}{\overline{\alpha}}\frac{T_s - T_\infty}{T_\infty},$$

where the ideal gas law, $P = \rho T_s R_{air}$ can be used. The last expression in equation (34) suggests that in the transition regime $$\left(Kn = \frac{\lambda}{a} \sim 1\right),$$

the air can flow around the disk at a significant fraction of the average speed of the air molecules (i.e., tens of meters per second).

Equation (33) can represent the velocity of a disk that is free to move in a gaseous medium without any forces acting on it. For a fixed (immobile) disk, the corresponding force acting on the disk can be obtained using the Stokes drag formula with an effective Stokes radius for a disk[54], $$r = \frac{8}{3\pi}a:$$

$$F_{co} = 6\pi\mu_{air}\left(\frac{8}{3\pi}a\right)U_{disk} = \quad (35)$$

$$16\mu_{air}aU_{disk} = 16\mu\frac{6\kappa_s\mu_{air}T_s k_{air}}{a\rho P\overline{v}}\frac{\gamma - 1}{\gamma + 1}\frac{\Delta\alpha}{\overline{\alpha}}\frac{(T_s - T_\infty)}{T_\infty}.$$

As a check to see whether the Stokes flow assumption is correct, the Reynolds Number can be evaluated using the migration velocity in equation (33), $$Re = \frac{\rho U_{disk} 2a}{\mu} = \pi\kappa_s\frac{\Delta\theta}{T_\infty} \ll 1,$$

which can justify the Stokes Flow assumption.

Force formula for the entire range of pressure: the photophoretic force can be combined in the free molecular (16) and the continuum (35) regimes to generate an interpolation valid for the entire range of pressure, $$F = \frac{1}{\frac{1}{F_{fm}} + \frac{1}{F_{co}}} = \frac{\pi}{4} \frac{\Delta\alpha(T_s - T_\infty)}{T_\infty} \frac{a^2 P^*}{\frac{P^2}{2P^{*2}} + \frac{P^*}{P}} \quad (36)$$

where P* is the pressure at which force can be maximized:

$$P^* = \frac{1}{a}\left(\frac{192}{\pi} \frac{\mu_{air}^2 k_B (\gamma-1) k_{air} T_{avg}^2}{m(\overline{\alpha})(\gamma+1)\overline{v}}\right)^{\frac{1}{3}} = \frac{\overline{v}\rho\lambda}{2a}\left(\frac{48(\gamma-1)(9\gamma-5)}{\pi m \overline{\alpha} \overline{v}} C_v k_B T_{avg}^2\right)^{\frac{1}{3}}. \quad (37)$$

All the parameters can be the same as defined as disclosed.

$$P^* \propto \frac{1}{a}$$

and, therefore, the maximum force:

$$F_{\Delta\alpha\_max} = \frac{\pi}{6} \frac{\Delta\alpha(T_s - T_\infty)}{T_\infty} a^2 P^* \quad (38)$$

Can scale linearly with the radius of the disk if all other parameters are held constant $$\left(P^* \propto \frac{1}{a} \rightarrow F_{\Delta\alpha\_max} \propto a\right).$$

Force Generation from Temperature Gradient Through a Thin Disk, ΔT-Force:
In the case of a disk with $$\frac{\text{Thickness}}{\text{radius}} \ll 1,$$

where the accommodation coefficient is equal on both sides, one can write the ΔT-force in the free molecular regime as $$F_{fm\_\Delta T} = \frac{\pi a^2}{4T_\infty} \alpha_{avg} P(T_{s\_H} - T_{s\_C})$$

where $T_{s\_H}$ and $T_{s\_C}$ are the surface temperature on the hot and cold side, respectively, and $\alpha_{avg}$ is an average value of the thermal accommodation coefficient of both sides of the sample. The continuum regime force can also be deduced from equations (33) and (35) by replacing $\Delta\alpha(T_s - T_\infty)$ with $\alpha(T_{s\_H} - T_{s\_C})$. This can result in:

$$U_{disk\_\Delta T} = \frac{\pi \kappa_s \mu_{air}}{2a\rho T_\infty} \Delta\theta = \frac{\pi \kappa_s \mu_{air}}{2a\rho T_\infty} \alpha(T_{s\_H} - T_{s\_C}) \quad (39)$$

$$F_{co\_\Delta T} = \frac{8\pi \kappa_s \mu_{air}^2}{\rho T_\infty} \alpha(T_{s\_H} - T_{s\_C}) \quad (40)$$

$$F_{\Delta T} = \frac{1}{\frac{1}{F_{fm\_\Delta T}} + \frac{1}{F_{co\_\Delta T}}} = \frac{\pi a^2}{4} \frac{\alpha(T_{s\_H} - T_{s\_C})}{T_\infty} \frac{32\kappa_s \mu_{air}^2 RT_\infty}{a^2 P + \frac{32\kappa_s \mu_{air}^2 RT_\infty}{P}} = \quad (41)$$

$$\frac{\pi}{4} \frac{\alpha(T_{s\_H} - T_{s\_C})}{T_\infty} \frac{32\kappa_s \mu_{air}^2 RT_\infty P}{P^2 + \frac{32\kappa_s \mu_{air}^2 RT_\infty}{a^2}}.$$

The force can be defined as:

$$F_{\Delta T} = \hat{F} \frac{P\hat{P}}{P^2 + \hat{P}^2} \quad (42)$$

$$\hat{P} = \frac{4\mu}{a}\sqrt{2\kappa RT_\infty}; \quad (43)$$

$$\hat{F} = \frac{\pi a \mu \alpha (T_{s\_H} - T_{s\_C})\sqrt{2\kappa RT_\infty}}{T_\infty} \quad (44)$$

where $\hat{P}$ is the pressure at which $F_{\Delta T}$ can be maximized, and the maximum can be written as:

$$F_{\Delta T\_max} = \frac{\hat{F}}{2} = \frac{\pi a \mu \alpha (T_{s\_H} - T_{s\_C})\sqrt{2\kappa RT_\infty}}{2T_\infty} \quad (45)$$

Figure 8B:
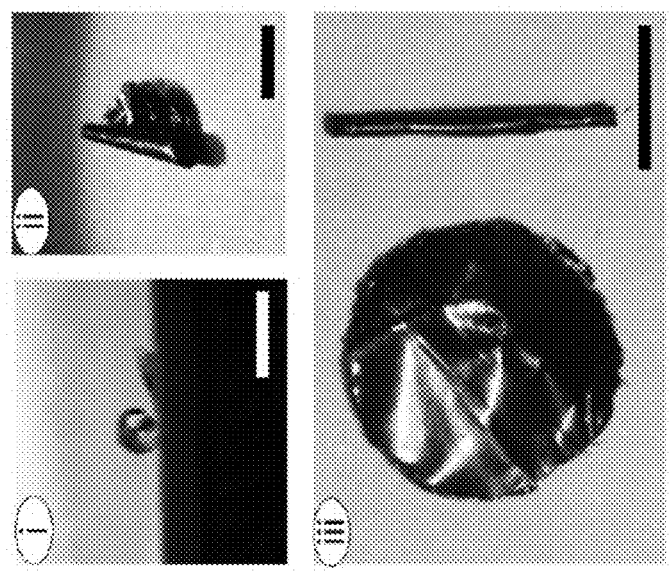
FIGS. 8A-8B illustrate example temperature estimation and thermally deformed samples in accordance with certain embodiments of the disclosed subject matter.
Figure 8A:
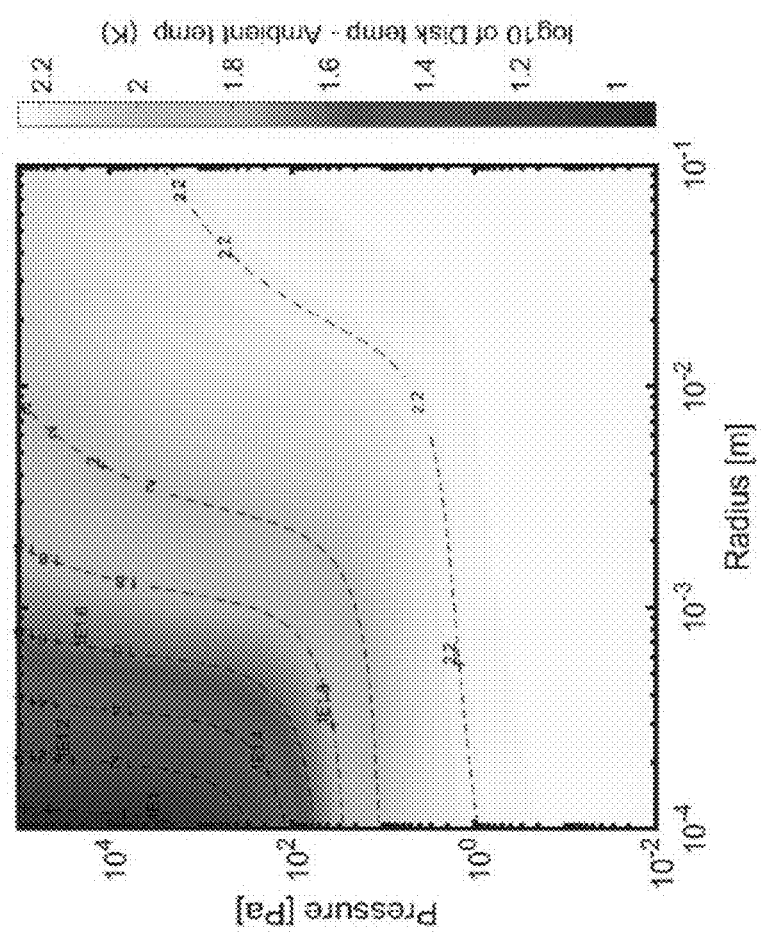

This formula can show that for a $(T_{s\_H} - T_{s\_C}) \sim 0.1$ K, even with full thermal accommodation, using values shown in FIGS. 8A-8B, and $$\frac{F_{max\_\Delta T}}{F_{max\_\Delta\alpha}} \sim \frac{(T_{s\_H} - T_{s\_C})}{\Delta\alpha(T_s - T_\infty)} < 0.01,$$

which demonstrates that $F_{\Delta T}$ can be negligible compared to $F_{\Delta\alpha}$ and insufficient to explain the observed levitation. FIGS. 8A-8B show example temperature estimation and thermally deformed samples. FIG. 8A shows a graph showing a calculated temperature of mylar disk under $$0.5 \frac{w}{cm^2}$$

incident light $\epsilon = 0.95$. This plot can be used to predict at what pressures, and with what radii, samples exceed a temperature threshold and deform. FIG. 8B shows i) side and ii) angled view of a 6 mm disk under $$0.6 \frac{w}{cm^2}$$

in 50 Pa environments. FIG. 8B also shows iii) undeformed (left) and deformed (right) 6 mm disk. The highly curled sample, which has rolled up into a cylinder with submillimeter diameter, can be under $$0.8 \frac{w}{cm^2}$$

in 50 Pa environment. All scale bars are 3 mm.

Figures 10A, 10B:
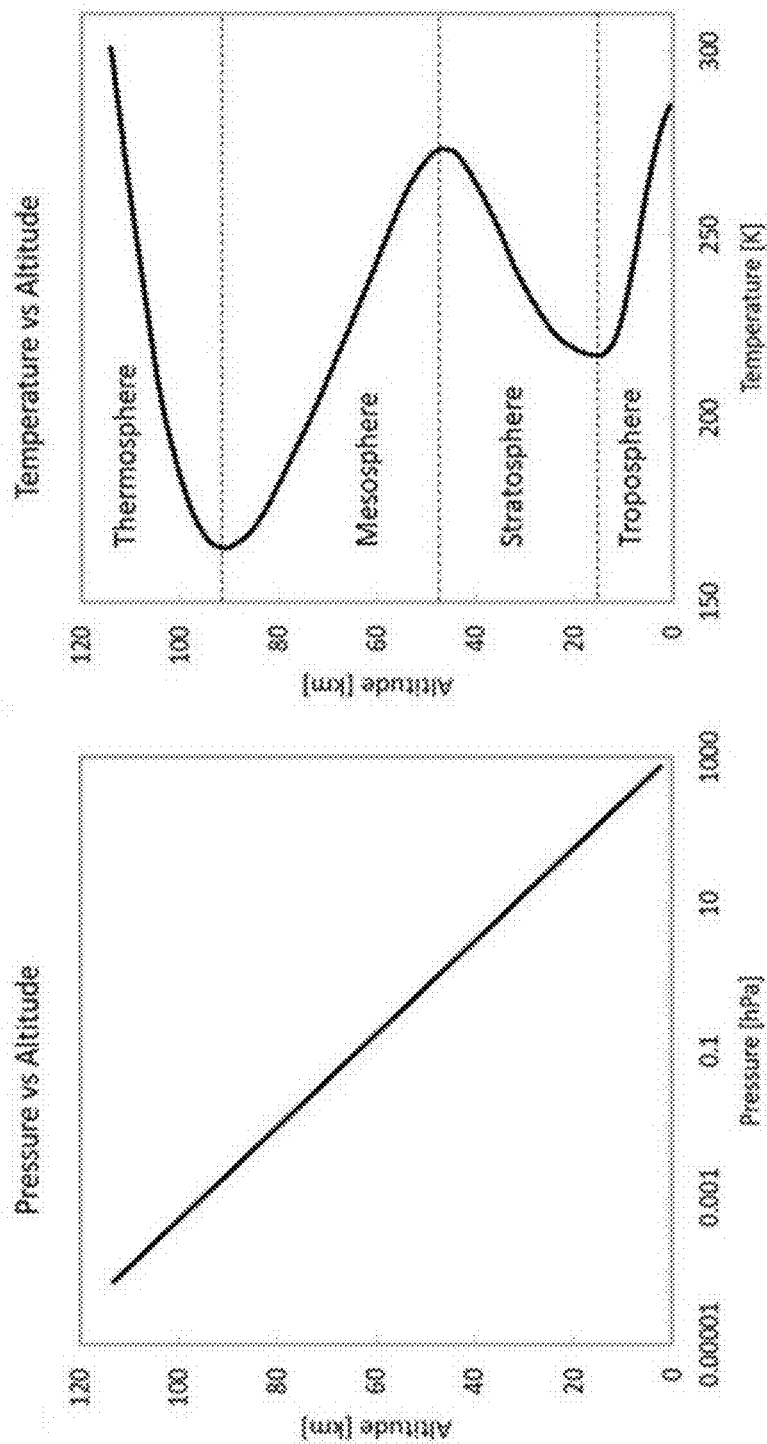
FIGS. 10A-10B illustrate graphs showing altitude-dependent pressure and temperature in accordance with certain embodiments of the disclosed subject matter.
Figure 12B:
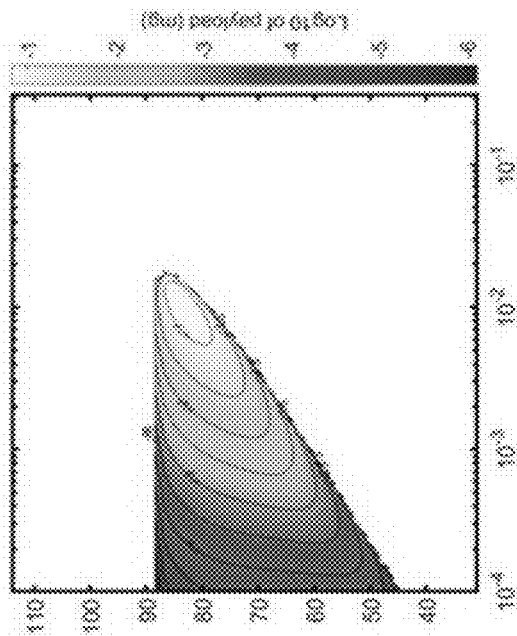
FIGS. 12A-12D illustrate example areal density graphs for the prediction of near-space flight in accordance with certain embodiments of the disclosed subject matter.
Figure 12A:
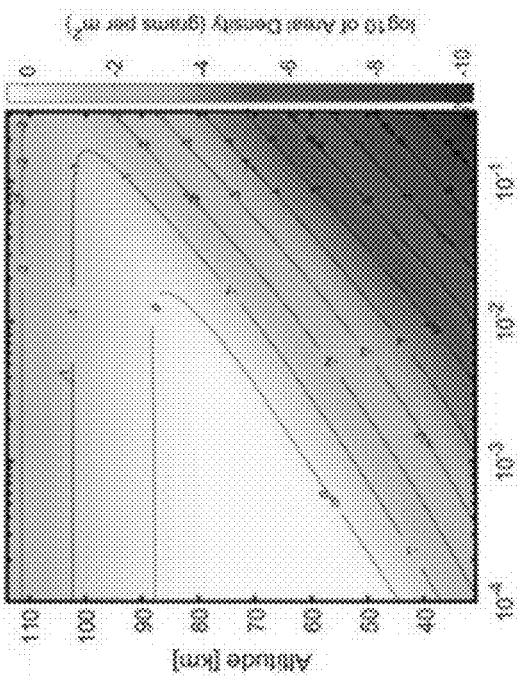
Figures 12C, 12D:
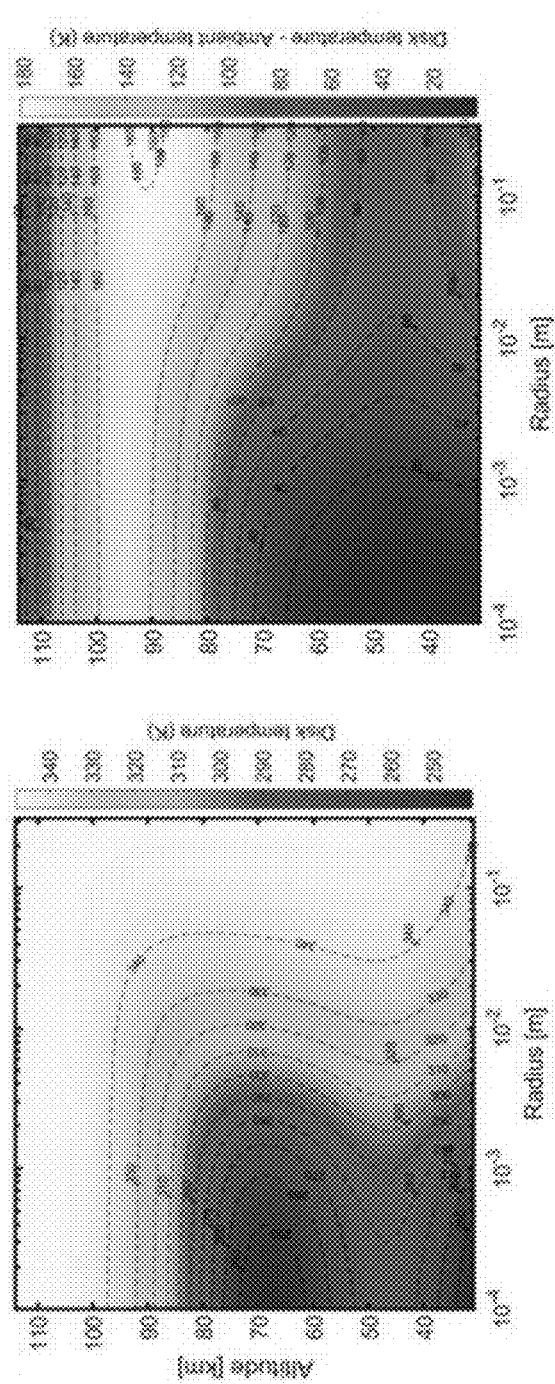
Figure 13A:
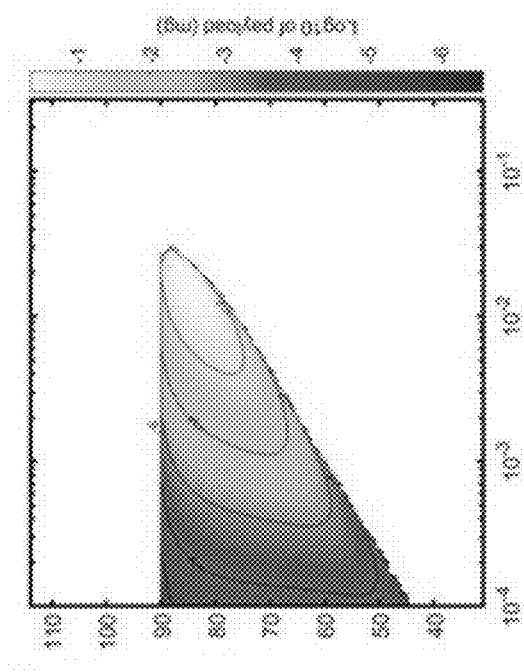
FIGS. 13A-13D illustrate another example areal density graphs for the prediction of near-space flight in accordance with certain embodiments of the disclosed subject matter.
Figure 13B:
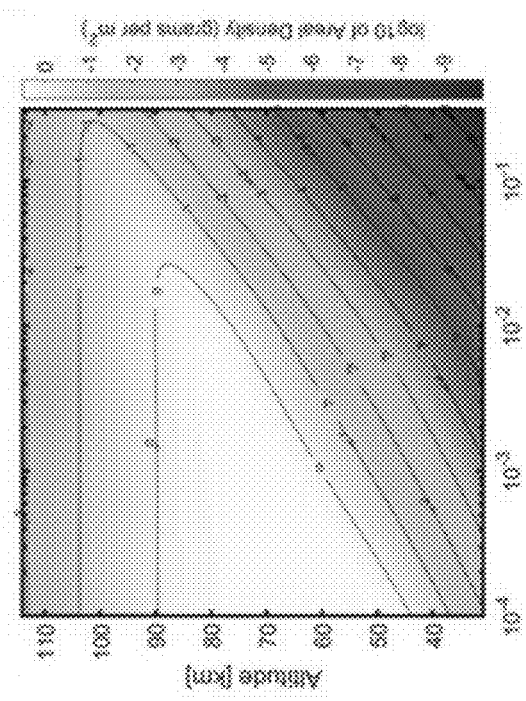
Figures 13C, 13D:
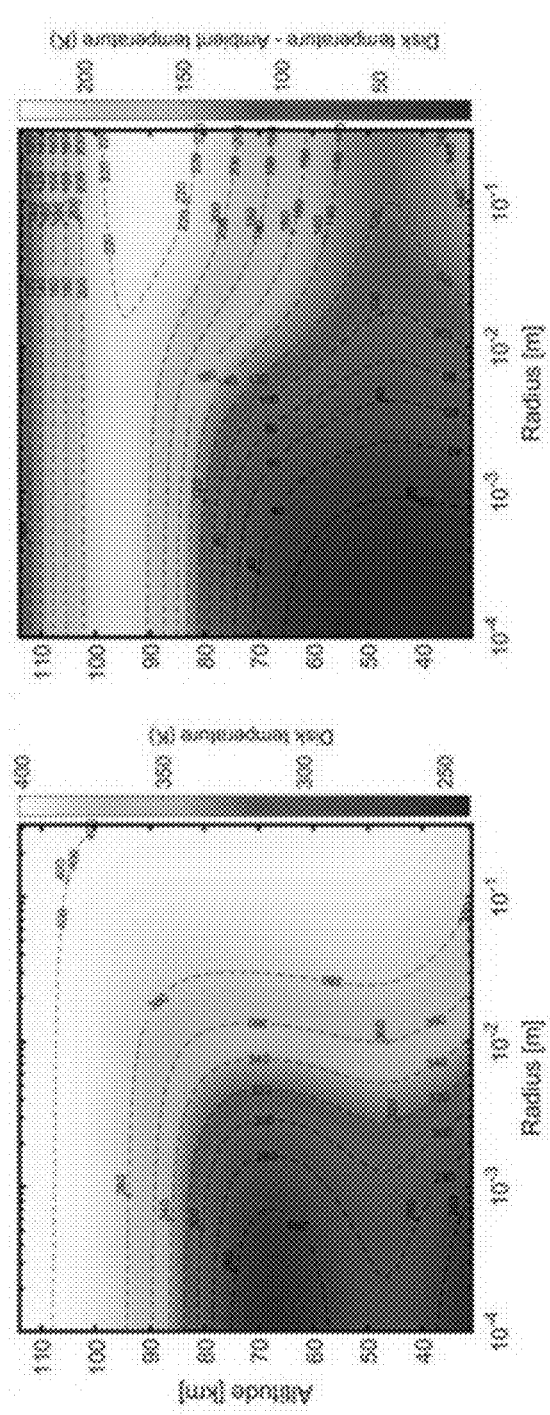
Figures 14A, 14B:
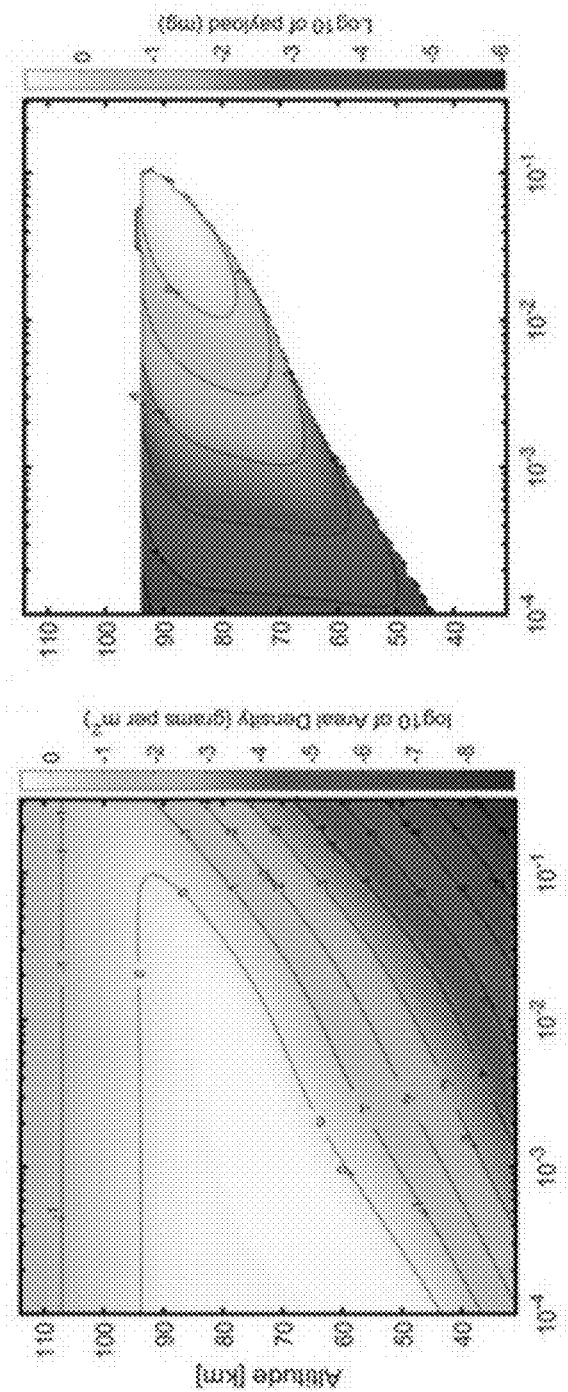
Figures 15A, 15B:
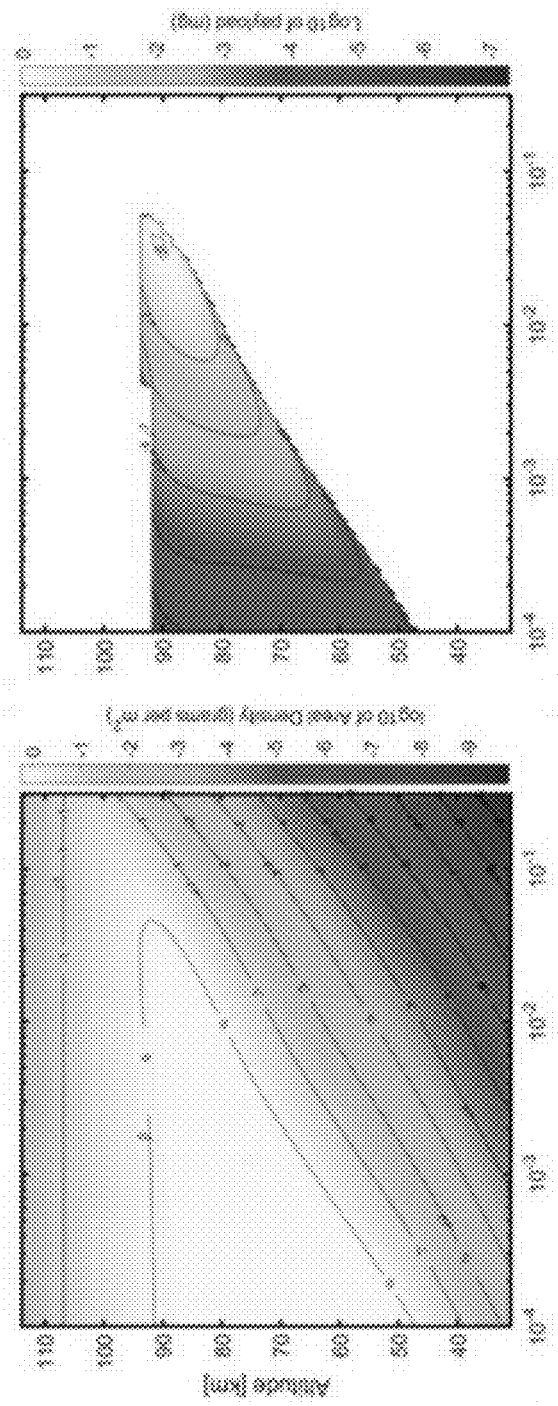
FIGS. 15A-15D illustrate another example areal density graphs for the prediction of near-space flight in accordance with certain embodiments of the disclosed subject matter.
Figures 15C, 15D:
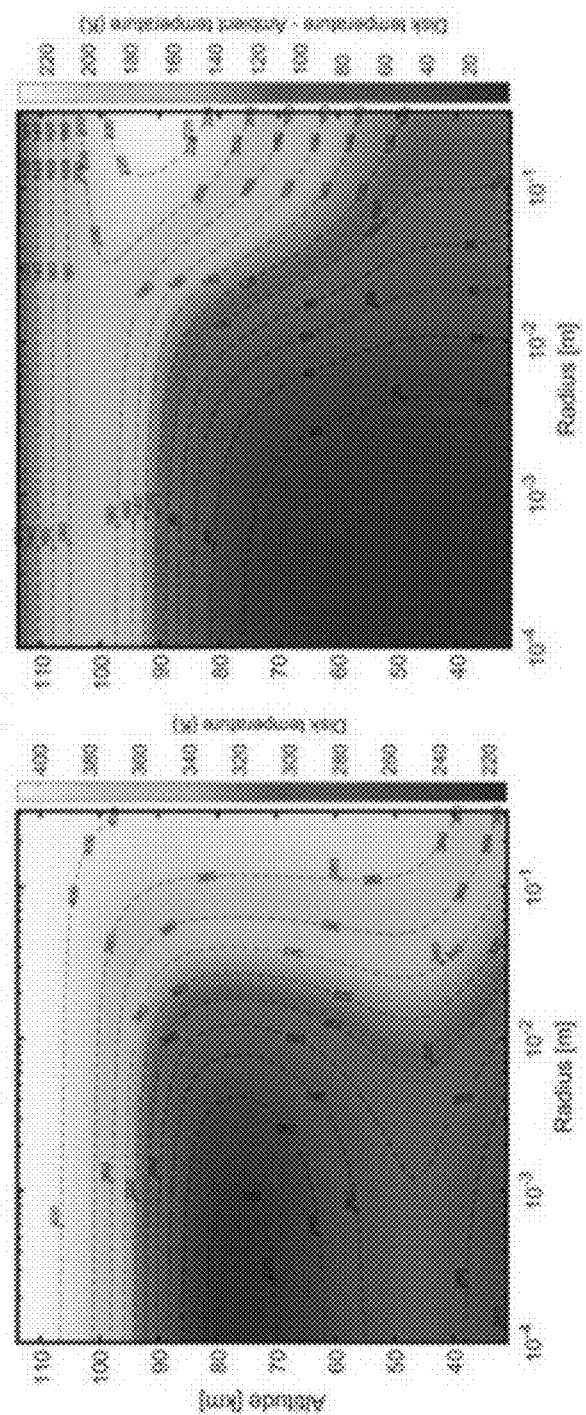
Figure 16B:
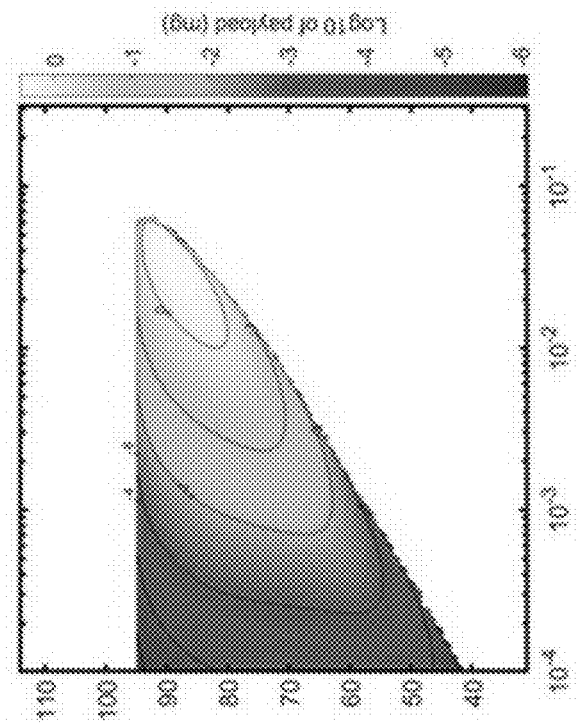
FIGS. 16A-16D illustrate another example areal density graphs for the prediction of near-space flight in accordance with certain embodiments of the disclosed subject matter.
Figure 16A:
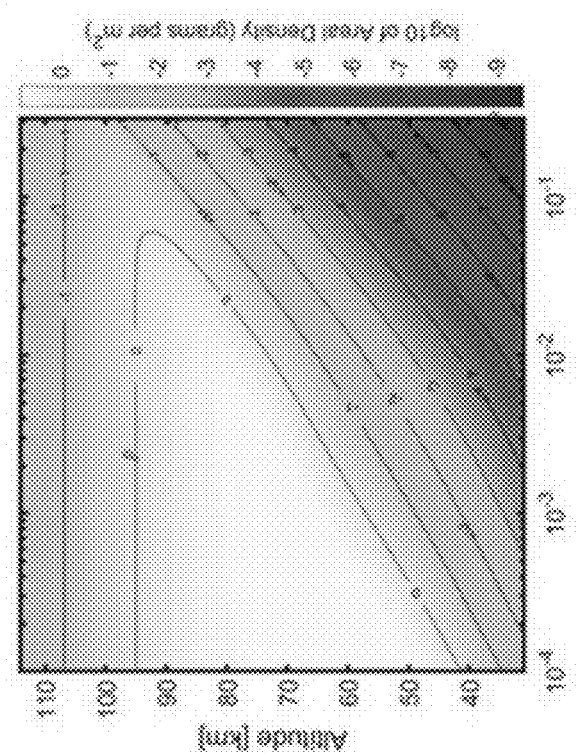
Figures 16C, 16D:
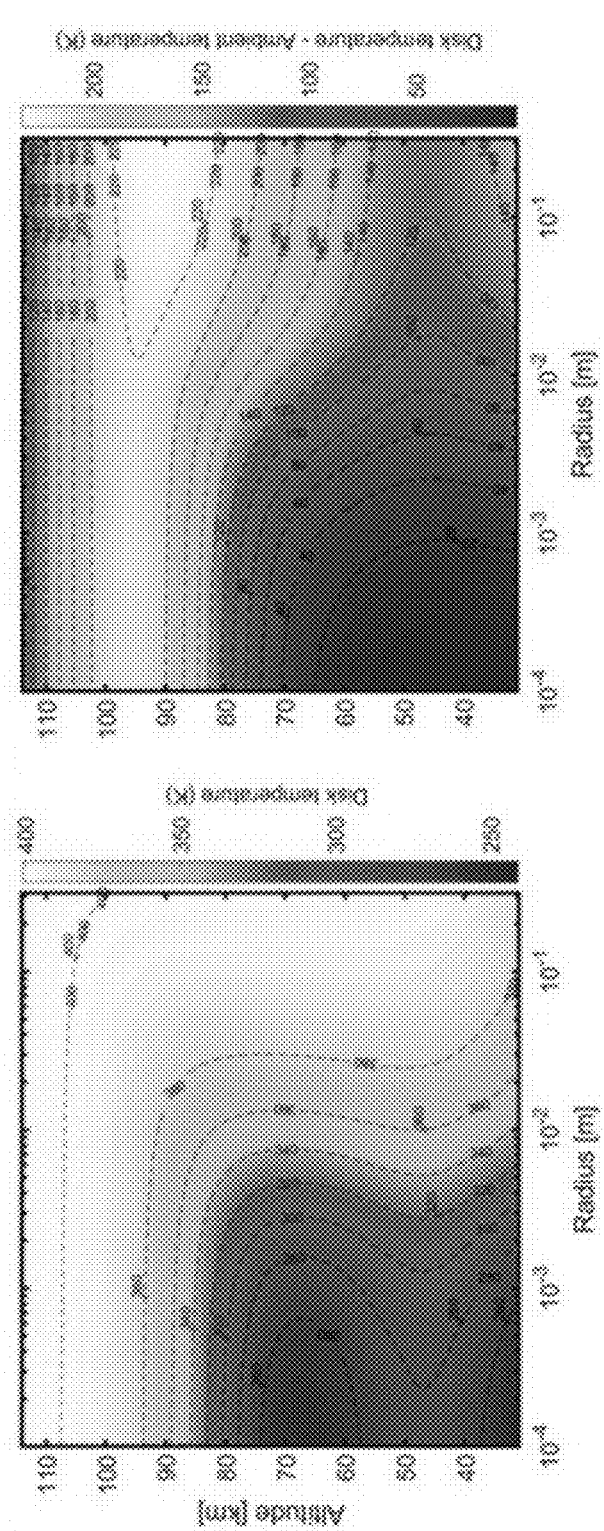

Altitude dependency of the properties for the Earth's atmosphere: In order to model changes in temperature and pressure of ambient air as a function of altitude, altitude dependency can be incorporated in all parts of the model that are functions of temperature and pressure. FIGS. 10A-10B show how the temperature (10B) and pressure (10A) depend on the altitude. The graphs represent annual and spatial averages, and the values can vary depending on the exact location and time of year.

Predicted payload for various combinations of emissivity and Δα: In addition to the predicted payload shown in FIG. 6, the maximum payload can be identified for other combinations of emissivity and the difference in the thermal accommodation coefficient. FIGS. 11A-11D provide graphs for determining of Δα for CNT covered mylar. Areal density that can be levitated under $$0.5 \frac{w}{cm^2}$$

is shown with ∈=0.95 and 11A) Δα=0.05 11B) Δα=0.1 11C) Δα=0.2 11D) Δα=0.25. The range of 0.1<Δα<0.2 results in an acceptable match between the observations and theoretical predictions.

FIGS. 12A-12D show the predicted payload for the parameters that provided the best fit to our actual experiments (with Δα=0.15, ∈=0.95). The maximum payload can be comparable to the weight of the disk itself (~0.1 mg) and can be achieved for disk radius of ~1 cm at altitudes of ~80 km. FIGS. 13A-13D show that reducing the thermal emissivity using a selective solar absorber with ∈=0.5 increases the maximum payload to ~0.5 mg, still achieved for a radius of ~1 cm at altitudes of ~80 km. FIGS. 14A-14D show that using an even lower emissivity of 0.1 makes the temperatures exceed 500 K, which can require the use of materials other than Mylar. However, such low emissivity can also allow levitation and significant payloads with much lower light intensities than full natural sunlight (FIGS. 15A-15D). Increasing the Δα to 0.3 improves the maximum payload to a few mg, achieved for radii of a few cm at altitudes of ~85 km (FIGS. 16A-16D). Using Δα=0.5 can result in maximum payloads of up to 10 mg for radii of ~3 cm at altitudes of ~90 km (as shown in FIG. 6).

All patents, patent applications, publications, product descriptions, and protocols, cited in this specification are hereby incorporated by reference in their entireties. In case of a conflict in terminology, the present disclosure controls.

While it will become apparent that the subject matter herein described is well calculated to achieve the benefits and advantages set forth above, the presently disclosed subject matter is not to be limited in scope by the specific embodiments described herein. It will be appreciated that the disclosed subject matter is susceptible to modification, variation, and change without departing from the spirit thereof. Those skilled in the art will recognize or be able to ascertain using no more than routine experimentation, many equivalents to the specific embodiments described herein. Such equivalents are intended to be encompassed by the following claims.

What is claimed is:

1. A system for achieving photophoretic levitation, comprising:
   a structure having a top side and a bottom side;
   wherein the top side comprises a first material configured to reflect a portion of incident particles without trapping the particles; and
   wherein the bottom side comprises a second material configured to trap incident particles for a first time period.

2. The system of claim 1, wherein the top side comprises a biaxially-oriented polyethylene terephthalate (BoPET) film.

3. The system of claim 2, wherein the BoPET film has a thickness of approximately 500 nanometers.

4. The system of claim 2, wherein the top side further comprises a layer of aluminum oxide deposited onto the BoPET film using atomic layer deposition.

5. The system of claim 1, wherein the bottom side comprises one or more carbon nanotubes.

6. The system of claim 5, wherein the one or more carbon nanotubes each have a diameter between 1 to 2 nanometers and a length between 5 and 30 micrometers.

7. The system of claim 1, wherein the bottom side has a thickness of approximately 300 nanometers.

8. The system of claim 1, wherein the structure comprises a disk.

9. The system of claim 8, wherein the disk has a diameter of approximately 6 millimeters.

10. The system of claim 1, wherein the second material is configured to provide rigidity to the structure.

11. The system of claim 1, wherein the second materials is a light absorber with a visible-range absorptivity of greater than 80%.

12. The system of claim 1, further comprising one or more components attached to the structure.

13. The system of claim 12, wherein the one or more components include at least a temperature sensor.

14. The system of claim 12, wherein the one or more components include at least a camera.

* * * * *